(12) United States Patent
Li et al.

(10) Patent No.: US 11,886,830 B2
(45) Date of Patent: Jan. 30, 2024

(54) VOICE CALL TRANSLATION CAPABILITY NEGOTIATION METHOD AND ELECTRONIC DEVICE

(71) Applicant: Huawei Technologies Co., Ltd., Shenzhen (CN)

(72) Inventors: Weijie Li, Shenzhen (CN); Xin Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 387 days.

(21) Appl. No.: 17/230,808

(22) Filed: Apr. 14, 2021

(65) Prior Publication Data

US 2021/0232778 A1 Jul. 29, 2021

Related U.S. Application Data

(63) Continuation of application No. PCT/CN2019/111124, filed on Oct. 15, 2019.

(30) Foreign Application Priority Data

Oct. 15, 2018 (CN) .......................... 201811198712.3

(51) Int. Cl.
*G06F 40/58* (2020.01)
*H04M 1/65* (2006.01)
*H04M 1/658* (2006.01)

(52) U.S. Cl.
CPC .......... *G06F 40/58* (2020.01); *H04M 1/6505* (2013.01); *H04M 1/658* (2013.01)

(58) Field of Classification Search
CPC ..... G06F 40/58; H04M 1/6505; H04M 1/658; H04M 1/72448; H04M 2250/74;
(Continued)

(56) References Cited

U.S. PATENT DOCUMENTS 9,681,471 B1 * 6/2017 Kurian .................. H04W 76/10
10,776,588 B2 9/2020 Yu et al.
(Continued)

FOREIGN PATENT DOCUMENTS

| CN | 1774714 A | 5/2006 |
|---|---|---|
| CN | 101154220 A | 4/2008 |

(Continued)

OTHER PUBLICATIONS

Sheng Yulin, "Design and Implementation of a Mobile Translation Tool Based on Cloud Services on Android Platform", Fudan University, Issue 03, 2015, With an English Abstract, 55 pages.

*Primary Examiner* — Bhavesh M Mehta
*Assistant Examiner* — Darioush Agahi
(74) *Attorney, Agent, or Firm* — Slater Matsil, LLP

(57) ABSTRACT

A voice call translation capability negotiation method and an electronic device are provided, and relate to the field of terminal technologies. The method includes: After a first electronic device establishes a communication link with a second electronic device, if a voice call translation function is enabled, the first electronic device receives first indication information sent by the second electronic device. The first indication information is used to indicate that a voice call translation function of the second electronic device is enabled. The first electronic device automatically disables the voice call translation function.

16 Claims, 27 Drawing Sheets

(58) Field of Classification Search
CPC ......... H04M 1/72433; H04M 2250/58; H04M 1/505; H04M 1/72436; H04M 2201/40; H04M 2242/12; H04W 76/10
See application file for complete search history.

(56) References Cited

U.S. PATENT DOCUMENTS

| | | |
|---|---|---|
| 2008/0077387 A1 | 3/2008 | Ariu |
| 2014/0114929 A1 | 4/2014 | Henrichs et al. |
| 2014/0242955 A1 | 8/2014 | Kang et al. |
| 2015/0227510 A1 | 8/2015 | Shin et al. |
| 2015/0350451 A1 | 12/2015 | Aue et al. |
| 2017/0149961 A1 | 5/2017 | Kim et al. |
| 2017/0357639 A1* | 12/2017 | Zamor .................. G10L 15/26 |
| 2019/0347331 A1* | 11/2019 | Yu ........................ G10L 15/26 |
| 2021/0232778 A1 | 7/2021 | Li et al. |

FOREIGN PATENT DOCUMENTS

| | | |
|---|---|---|
| CN | 102360347 A | 2/2012 |
| CN | 104010267 A | 8/2014 |
| CN | 106462573 A | 2/2017 |
| CN | 107015970 A | 8/2017 |
| CN | 206470756 U | 9/2017 |
| CN | 107343113 A | 11/2017 |
| CN | 107885732 A | 4/2018 |
| CN | 107886940 A | 4/2018 |
| CN | 107993646 A | 5/2018 |
| CN | 108228575 A | 6/2018 |
| CN | 108650419 A | 10/2018 |
| CN | 109327613 A | 2/2019 |
| CN | 109582976 A | 4/2019 |
| KR | 20140121516 A | 10/2014 |

* cited by examiner

VOICE CALL TRANSLATION CAPABILITY NEGOTIATION METHOD AND ELECTRONIC DEVICE

CROSS-REFERENCE TO RELATED APPLICATIONS

This application is a continuation of International Application No. PCT/CN2019/111124, filed on Oct. 15, 2019, which claims priority to Chinese Patent Application No. 201811198712.3, filed on Oct. 15, 2018. The disclosures of the aforementioned applications are hereby incorporated by reference in their entireties.

TECHNICAL FIELD

This application relates to the field of terminal technologies, and especially, to a voice call translation capability negotiation method and an electronic device.

BACKGROUND

With popularization of electronic devices such as mobile phones, communication between people is no longer restricted by time and space, which brings great convenience to people's life and work. However, limited by geographical factors, communication between two parties may be hindered due to different languages.

Therefore, it is of great practical value to study how to make communication parties using different languages understand each other by using mobile phones.

SUMMARY

This application provides a voice call translation capability negotiation method and an electronic device, to help reduce a possibility that an error occurs on an electronic device in a voice call, thereby improving efficiency of making a call by a user through an electronic device.

According to a first aspect, an embodiment of this application provides a voice call translation capability negotiation method. The method includes following. After a first electronic device establishes a communication link with a second electronic device, if a voice call translation function is in an enabled state, the first electronic device receives first indication information sent by the second electronic device. The first indication information is used to indicate that a voice call translation function of the second electronic device is enabled. When the voice call translation function is in an enabled state, the first electronic device is configured to: obtain a translation result of a speech collected by the first electronic device through a microphone; obtain a translation result of a received speech sent by the second electronic device; and send, to the second electronic device, the translation result of the speech collected through the microphone. When the voice call translation function is in an enabled state, the second electronic device is configured to: obtain a translation result of a speech collected by the second electronic device through a microphone; obtain a translation result of a received speech sent by the first electronic device; and send, to the first electronic device, the translation result of the speech collected through the microphone. The first electronic device automatically disables the voice call translation function in response to the first indication information.

In this embodiment of this application, after the communication link is established, when the first electronic device and the second electronic device both support dual-end speech translation, only the voice call translation function of one of the first electronic device and the second electronic device needs to be enabled. This helps reduce a possibility that an error occurs because of repeated translation in a voice call when the voice call translation functions of the first electronic device and the second electronic device are both enabled, and helps improve efficiency of making a call by a user through an electronic device.

In a possible design, the first indication information is a first character sent in a dual-tone multifrequency DTMF tone. This helps simplify implementations.

In a possible design, after automatically disabling the voice call translation function, the first electronic device sends second indication information to the second electronic device. The second indication information is used to indicate that the voice call translation function of the first electronic device is disabled. This helps the first electronic device learn of a status in which the voice call translation function of the second electronic device is enabled or disabled.

In a possible design, the first electronic device displays first prompt information on a display, where the first prompt information is used to prompt a user that the voice call translation function of the second electronic device is enabled; and/or the first electronic device prompts, through voice broadcast, the user that the voice call translation function of the second electronic device is enabled. This helps improve interaction between an electronic device and a user.

In a possible design, after the first electronic device automatically disables the voice call translation function, the first electronic device prohibits the user from enabling the voice call translation function. This helps reduce a possibility of a user misoperation.

In a possible design, after prohibiting the user from enabling the voice call translation function, the first electronic device displays second prompt information on the display, where the second prompt information is used to prompt that the user is prohibited from enabling the voice call translation function, and is used to cancel, after the voice call function of the second electronic device is disabled or the communication link is disconnected, the restriction on enabling the voice call translation function by the user; and/or the first electronic device prompts, through voice broadcast, that the user is prohibited from enabling the voice call translation function, and cancels, after the voice call function of the second electronic device is disabled or the communication link is disconnected, the restriction imposed on enabling of the voice call translation function by the user. This helps improve interaction between an electronic device and a user.

According to a second aspect, an embodiment of this application provides another voice call translation capability negotiation method. The method includes:

After a first electronic device establishes a communication link with a second electronic device, if a voice call translation function is in an enabled state, the first electronic device receives first indication information sent by the second electronic device. The first indication information is used to indicate that a voice call translation function of the second electronic device is enabled. When the voice call translation function is in an enabled state, the first electronic device is configured to: obtain a translation result of a speech collected by the first electronic device through a microphone; obtain a translation result of a received speech sent by the second electronic device; and send, to the second electronic device, the translation result of the speech collected through the microphone. When the voice call translation function is in an enabled state, the second electronic device is configured to: obtain a translation result of a speech collected by the second electronic device through a microphone; obtain a translation result of a received speech sent by the first electronic device; and send, to the first electronic device, the translation result of the speech collected through the microphone. The first electronic device sends second indication information to the second electronic device. The second indication information is used to indicate the second electronic device to disable the voice call translation function.

In this embodiment of this application, after the communication link is established, when the first electronic device and the second electronic device both support dual-end speech translation, only the voice call translation function of one of the first electronic device and the second electronic device needs to be enabled. This helps reduce a possibility that an error occurs because of repeated voice call translation when the voice call translation functions of the first electronic device and the second electronic device are both enabled, and helps improve efficiency of making a call by a user through an electronic device.

In a possible design, the first indication information is a first character sent in a dual-tone multifrequency DTMF tone. This helps simplify implementations.

In a possible design, after sending the second indication information to the second electronic device, the first electronic device receives third indication information sent by the second electronic device. The third indication information is used to indicate that the voice call translation function of the second electronic device is disabled. This helps the first electronic device learn of a status in which the voice call translation function of the second electronic device is enabled or disabled.

In a possible design, after disabling the voice call translation function, the first electronic device sends fourth indication information to the second electronic device. The fourth indication information is used to indicate that the voice call translation function of the first electronic device is disabled. This helps the second electronic device enable the voice call translation function of the second electronic device in a voice call when the voice call translation function of the first electronic device is disabled, so as to improve voice call efficiency.

According to a third aspect, an embodiment of this application provides a voice call translation capability negotiation method. The method includes:

After a first electronic device establishes a communication link with a second electronic device, if a voice call translation function is in an enabled state, the first electronic device receives first indication information sent by the second electronic device. The first indication information is used to indicate that a voice call translation function of the second electronic device is enabled. When the voice call translation function is in an enabled state, the first electronic device is configured to: obtain a translation result of a speech collected by the first electronic device through a microphone; and send, to the second electronic device, the translation result of the speech collected through the microphone. When the voice call translation function is in an enabled state, the second electronic device is configured to: obtain a translation result of a speech collected by the second electronic device through a microphone; and send, to the first electronic device, the translation result of the speech collected through the microphone. After receiving the first indication information, the first electronic device disables a voice broadcast mode, and enables a text display mode. When the voice broadcast mode is disabled and the text display mode is enabled, the first electronic device skips broadcasting the translation result of the speech collected by the second electronic device through the microphone, and displays a text of the translation result of the speech collected by the second electronic device through the microphone. The first electronic device sends second indication information to the second electronic device. The second indication information is used to indicate the second electronic device to disable a voice broadcast mode and enable a text display mode. When the voice broadcast mode is disabled and the text display mode is enabled, the second electronic device skips broadcasting the translation result of the speech collected by the first electronic device by using the microphone, and displays a text of the translation result of the speech collected by the first electronic device through the microphone.

In this embodiment of this application, when the first electronic device and the second electronic device both support a local-end speech translation, the first electronic device and the second electronic device may be prompted with respective meanings by prohibiting a translation result of a speech from being broadcast and displaying a text of the translation result of the speech. This helps reduce a possibility that a microphone of an electronic device collects a translation result of a speech for translation during voice broadcast, and helps improve performance of the electronic device.

In a possible design, when the voice call translation function of the first electronic device is in an enabled state, the first electronic device is further configured to send, to the second electronic device, the speech collected through the microphone. When the voice call translation function of the second electronic device is in an enabled state, the second electronic device is further configured to send, to the first electronic device, the speech collected through the microphone.

In a possible design, when the voice broadcast mode is disabled, the first electronic device skips broadcasting the speech that is collected through the microphone and that is sent by the second electronic device. This helps further improve performance of the electronic device.

According to a fourth aspect, an embodiment of this application provides an electronic device, including one or more processors, a memory, a plurality of application programs, and one or more computer programs. The one or more computer programs are stored in the memory. The computer program is executed by the electronic device to implement the method according to each of the foregoing aspects and any possible design of each of the foregoing aspects in the embodiments of this application.

According to a fifth aspect, an embodiment of this application provides a chip. The chip is coupled to a memory in an electronic device, so that when the chip runs, the chip invokes a computer program stored in the memory, to implement the method according to each of the foregoing aspects and any possible design of each of the foregoing aspects in the embodiments of this application.

According to a sixth aspect, an embodiment of this application provides a computer storage medium. The computer storage medium stores a computer program, and when the computer program is run on an electronic device, the electronic device is enabled to perform the method according to each of the foregoing aspects and any possible design of each of the foregoing aspects in the embodiments of this application.

According to a seventh aspect, an embodiment of this application provides a computer program product. When the computer program product is run on an electronic device, the electronic device is enabled to perform the method according to each of the foregoing aspects and any possible design of each of the foregoing aspects in the embodiments of this application.

In addition, for technical effects brought by any possible design manner in the fourth to the seventh aspects, refer to technical effects brought by different design manners in the method part. Details are not described herein again.

BRIEF DESCRIPTION OF THE DRAWINGS

FIG. 4a-1 to FIG. 4a-4 are a schematic diagram of an application scenario according to an embodiment of this application;

FIG. 4b-1 to FIG. 4b-3 are a schematic diagram of an application scenario of a voice call translation function according to an embodiment of this application;

DETAILED DESCRIPTION OF ILLUSTRATIVE EMBODIMENTS

It should be understood that, in the embodiments of this application, "at least one" means one or more, and "a plurality of" means two or more. The term "and/or" describes an association relationship between associated objects, and indicates that three relationships may exist. For example, A and/or B may represent the following three relationships: Only A exists, both A and B exist, and only B exists. A and B may be singular or plural. The character "/" generally indicates an "or" relationship between the associated objects. The term "at least one piece (item) of the following" or a similar expression thereof means any combination of these items, including any combination of a singular item (piece) or plural items (pieces). For example, at least one (piece) of a, b, or c may indicate a, b, c, a and b, a and c, b and c, or a, b, and c, where a, b, and c may be singular or plural.

It should be understood that the embodiments of this application may be applied to an electronic device. For example, the electronic device may be a portable electronic device, such as a mobile phone, a tablet computer, a wearable device (such as a smartwatch) having a wireless communication function, or a vehicle-mounted device. An example embodiment of the portable electronic device includes but is not limited to a portable electronic device using iOS®, Android®, Microsoft®, or another operating system. The portable electronic device may alternatively be, for example, a laptop having a touch-sensitive surface (for example, a touch panel). It should be further understood that, in some other embodiments of this application, an electronic device 100 may alternatively be a desktop computer having a touch-sensitive surface (for example, a touch panel).

Figure 1:
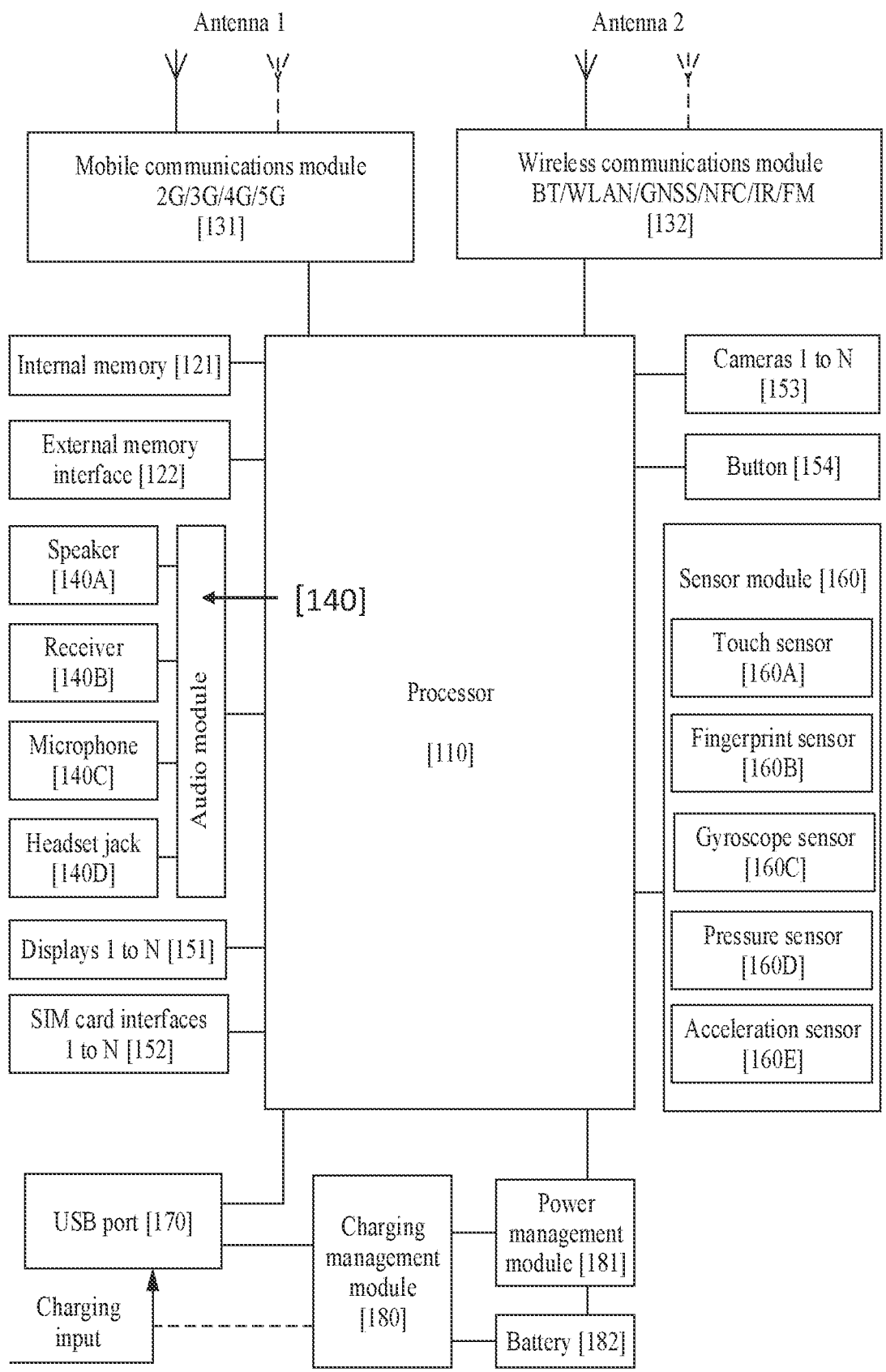
FIG. 1 is a schematic diagram of a hardware architecture of an electronic device according to an embodiment of this application.

For example, FIG. 1 is a schematic diagram of a hardware structure of an electronic device to which an embodiment of this application is applicable. As shown in FIG. 1, the electronic device includes a processor 110, an internal memory 121, an external memory interface 122, an antenna 1, a mobile communications module 131, an antenna 2, a wireless communications module 132, an audio module 140, a speaker 140A, a receiver 140B, a microphone 140C, a headset jack 140D, a display 151, a subscriber identity module (SIM) card interface 152, a camera 153, a button 154, a sensor module 160, a universal serial bus (USB) port 170, a charging management module 180, a power management module 181, and a battery 182. In some other embodiments, the electronic device may further include a motor, an indicator, and the like.

The processor no may include one or more processing units. For example, the processor no may include an application processor (AP), a modem processor, a graphics processing unit (GPU), an image signal processor (ISP), a controller, a video codec, a digital signal processor (DSP), a baseband processor, and/or a neural processing unit (neural-network processing unit, NPU). Different processing units may be independent devices, or may be integrated into one or more processors.

In some embodiments, a memory may be further disposed in the processor no, and is configured to store an instruction and data. For example, the memory in the processor no may be a cache. The memory may be configured to store an instruction or data that is just used or cyclically used by the processor no. If the processor no needs to use the instruction or the data again, the processor no may directly invoke the instruction or the data from the memory, to avoid repeated access and reduce a waiting time of the processor no, thereby improving system efficiency.

The internal memory 121 may be configured to store computer-executable program code. The executable program code includes an instruction. The processor no runs the instruction stored in the internal memory 121 to perform various function applications of the electronic device and data processing. The internal memory 121 may include a program storage area and a data storage area. The program storage area may store an operating system, an application required by at least one function (for example, a sound play function and an image play function), and the like. The data storage area may store data (such as audio data and a phone book) created when the electronic device is used, and the like. In addition, the internal memory 121 may include a high-speed random access memory, or may include a non-volatile memory, for example, at least one magnetic disk storage device, a flash memory device, or a universal flash storage (UFS).

The external memory interface 122 may be configured to connect to an external memory card (such as a micro SD card), to extend a storage capability of the electronic device. The external memory card communicates with the processor no through the external memory interface 122, to implement a data storage function, for example, to store files such as music and a video in the external memory card.

The antenna 1 and the antenna 2 are configured to transmit and receive an electromagnetic wave signal. Each antenna in the electronic device may be configured to cover one or more communication bands. Different antennas may be further multiplexed, to increase antenna utilization. For example, the antenna 1 may be multiplexed as a diversity antenna in a wireless local area network. In some other embodiments, an antenna may be used in combination with a tuning switch.

The mobile communications module 131 may provide a solution, applied to the electronic device, to wireless communication including 2G, 3G, 4G, 5G, or the like. The mobile communications module 131 may include at least one filter, a switch, a power amplifier, a low noise amplifier (LNA), and the like. The mobile communications module 131 may receive an electromagnetic wave signal through the antenna 1, perform processing such as filtering or amplification on the received electromagnetic wave signal, and transmit the electromagnetic wave signal to the modem processor for demodulation. The mobile communications module 131 may further amplify a signal modulated by the modem processor, and convert the signal into an electromagnetic wave signal through the antenna 1 for radiation. In some embodiments, at least some function modules in the mobile communications module 131 may be disposed in the processor no. In some embodiments, at least some function modules in the mobile communications module 131 may be disposed in a same device as at least some modules in the processor no. For example, the mobile communications module 131 may send a voice to another electronic device, or may receive a voice sent by another electronic device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (not limited to the speaker 140A, the receiver 140B, or the like), or displays an image or a video through the display 151. In some embodiments, the modem processor may be an independent device. In some other embodiments, the modem processor may be independent of the processor no, and is disposed in a same device as the mobile communications module 131 or another function module.

The wireless communications module 132 may provide a solution, applied to the electronic device, to wireless communication including a wireless local area network (WLAN) (for example, a Wi-Fi network), Bluetooth (BT), a global navigational satellite system (GNSS), frequency modulation (FM), near field communication (NFC), an infrared (IR) technology, or the like. The wireless communications module 132 may be one or more devices integrating at least one communications processing module. The wireless communications module 132 receives an electromagnetic wave signal through the antenna 2, performs frequency modulation and filtering processing on the electromagnetic wave signal, and sends a processed signal to the processor no. The wireless communications module 132 may further receive a to-be-sent signal from the processor no, perform frequency modulation and amplification on the signal, and convert a processed signal into an electromagnetic wave signal through the antenna 2 for radiation.

In some embodiments, in the electronic device, the antenna 1 is coupled to the mobile communications module 131, and the antenna 2 is coupled to the wireless communications module 132. Therefore, the electronic device can communicate with a network and another device by using a wireless communications technology. The wireless communications technology may include a global system for mobile communications (GSM), a general packet radio service (GPRS), code division multiple access (CDMA), wideband code division multiple access (WCDMA), time division-code division multiple access (time-division code division multiple access, TD-SCDMA), long term evolution (LTE), BT, the GNSS, the WLAN, the NFC, the FM, the IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (satellite based augmentation systems, SBAS).

The electronic device may implement audio functions such as music play and recording through the audio module 140, the speaker 140A, the receiver 140B, the microphone 140C, the headset jack 140D, the application processor, and the like.

The audio module 140 may be configured to convert digital audio information into an analog audio signal for output, and is also configured to convert an analog audio input into a digital audio signal. The audio module 140 may be further configured to perform audio signal encoding and decoding. In some embodiments, the audio module 140 may be disposed in the processor 110, or some function modules in the audio module 140 are disposed in the processor 110.

The speaker 140A, also referred to as a "horn", is configured to convert an audio electrical signal into a sound signal. The electronic device may listen to music or answer a hands-free call through the speaker 140A.

The receiver 140B, also referred to as an "earpiece", is configured to convert an audio electrical signal into a sound signal. When the electronic device answers a call or receives a voice message, the receiver 140B may be put close to a human ear to listen to the voice.

The microphone 140C, also referred to as a "mike" or a "microphone", is configured to convert a sound signal into an electrical signal. When making a call or sending a voice message, a user may make a sound near the microphone 140C through the mouth of the user, and the microphone 140C may be configured to collect the sound of the user and then convert the sound of the user into an electrical signal. At least one microphone 140C may be disposed in the electronic device. In some other embodiments, two microphones 140C may be disposed in the electronic device, to collect a sound signal and further implement a noise reduction function. In some other embodiments, three, four, or more microphones 140C may alternatively be disposed in the electronic device, to collect a sound signal, reduce noise, identify a sound source, implement a directional recording function, and the like.

The headset jack 140D is configured to connect to a wired headset. The headset jack 140D may be the USB port 130, or may be a 3.5 mm open mobile electronic device platform (open mobile terminal platform, OMTP) standard interface, a cellular telecommunications industry association of the USA (CTIA) standard interface, or the like.

The electronic device may implement a display function through the GPU, the display 151, the application processor, and the like. The GPU is a microprocessor for image processing, and is connected to the display 151 and the application processor. The GPU is configured to: perform mathematical and geometric calculation, and perform graphics rendering. The processor no may include one or more GPUs, which execute a program instruction to generate or change display information.

The display 151 may be configured to display an image, a video, and the like. The display 151 may include a display panel. The display panel may be a liquid crystal display (LCD), an organic light-emitting diode (OLED), an active-matrix organic light emitting diode (AMOLED), a flexible light-emitting diode (FLED), Miniled, MicroLed, Micro-oLed, a quantum dot light emitting diode (QLED), or the like. In some embodiments, the electronic device may include one or N displays 151, where N is a positive integer greater than 1.

The electronic device may implement a photographing function through the ISP, the camera 153, the video codec, the GPU, the display 151, the application processor, and the like.

The ISP is configured to process data fed back by the camera 153. For example, during photographing, a shutter is pressed, and an optical signal is collected by using the camera 153. Then, the camera 153 converts the collected optical signal into an electrical signal, and transmits the electrical signal to the ISP for processing. The ISP converts the electrical signal into an image that is visible to the eye. The ISP may further perform algorithm optimization on noise, luminance, and complexion of the image. The ISP may further optimize parameters such as exposure and a color temperature of a photographing scenario. In some embodiments, the ISP may be disposed in the camera 193.

The camera 153 may be configured to capture a static image or a video. Generally, the camera 153 includes a lens and an image sensor. An optical image of an object is generated through the lens, and is projected onto the image sensor. The image sensor may be a charge-coupled device (charge coupled device, CCD) or a complementary metal-oxide-semiconductor (CMOS) photoelectric transistor. The image sensor converts an optical signal into an electrical signal, and then transmits the electrical signal to the ISP. The ISP converts the electrical signal into a digital image signal, and outputs the digital image signal to the DSP for processing. The DSP converts the digital image signal into a standard image signal in a format such as RGB or YUV. In some embodiments, the electronic device may include one or N cameras 153, where N is a positive integer greater than 1.

The button 154 may include a power button, a volume button, and the like. The button 154 may be a mechanical button, or may be a touch button. The electronic device may receive a button input, and generate a button signal input related to a user setting and function control of the electronic device.

The sensor module 160 may include one or more sensors, for example, a touch sensor 160A, a fingerprint sensor 160B, a gyroscope sensor 160C, a pressure sensor 160D, and an acceleration sensor 160E. In some embodiments, the sensor module 160 may further include an environment sensor, a range sensor, an optical proximity sensor, a bone conduction sensor, and the like.

The touch sensor 160A may also be referred to as a "touch panel". The touch sensor 160A may be disposed in the display 151. The touch sensor 160A and the display 151 constitute a touchscreen that is also referred to as a "touchscreen". The touch sensor 160A is configured to detect a touch operation performed on or near the touchscreen. The touch sensor 160A may transfer the detected touch operation to the application processor, to determine a type of a touch event, and provide a corresponding visual output related to the touch operation through the display 151. In some other embodiments, the touch sensor 160A may also be disposed on a surface of the electronic device at a location different from that of the display 151.

The fingerprint sensor 160 may be configured to collect a fingerprint. The electronic device may implement fingerprint-based unlocking, application lock access, fingerprint-based photographing, fingerprint-based call answering, and the like by using a feature of the collected fingerprint.

The gyroscope sensor 160C may be configured to determine a motion posture of the electronic device. In some embodiments, an angular velocity of the electronic device around three axes (that is, axes x, y, and z) may be determined through the gyroscope sensor 160C. The gyroscope sensor 160C may be used for image stabilization during photographing. For example, when the shutter is pressed, the gyroscope sensor 160C detects an angle at which the electronic device jitters, calculates, based on the angle, a distance for which a lens module needs to compensate, and allows the lens to eliminate the jitter of the electronic device through a reverse motion, to implement image stabilization. The gyroscope sensor 160C may be further used in a navigation scenario and a somatic game scenario.

The pressure sensor 160D is configured to sense a pressure signal, and can convert the pressure signal into an electrical signal. In some embodiments, the pressure sensor 160D may be disposed in the display 151. There are many types of pressure sensors 160D, for example, a resistive pressure sensor, an inductive pressure sensor, and a capacitive pressure sensor. The capacitive pressure sensor may include at least two parallel plates made of conductive materials. When force is applied to the pressure sensor 180A, a capacitance between electrodes changes. The electronic device determines a pressure strength based on a capacitance change. When a touch operation is performed on the display 194, the electronic device detects a strength of the touch operation based on the pressure sensor 180A. The electronic device may also calculate a touch position based on a detection signal of the pressure sensor 180A. In some embodiments, touch operations that are performed on a same touch position but have different touch operation strengths may correspond to different operation instructions. For example, when a touch operation whose touch operation strength is less than a first pressure threshold is performed on an icon of Messages, an instruction for viewing an SMS message is executed; or when a touch operation whose touch operation strength is greater than or equal to a first pressure threshold is performed on an icon of Messages, an instruction for creating a new SMS message is executed.

The acceleration sensor 160E may detect acceleration values in various directions (usually on three axes) of the electronic device, and may detect a gravity value and a gravity direction when the electronic device is still. The acceleration sensor 160E may be further configured to identify a posture of the electronic device, and is applied to applications such as a pedometer and switching between a landscape mode and a portrait mode.

In some other embodiments, the processor no may alternatively include one or more interfaces. For example, the interface may be the SIM card interface 152. For another example, the interface may be the USB port 170. For still another example, the interface may be an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), or a general-purpose input/output (GPIO) interface. It can be understood that, in the embodiments of this application, the processor no may be connected to different modules of the electronic device through the interface, so that the electronic device can implement different functions, for example, photographing and processing. It should be noted that an interface connection manner of the electronic device is not limited in the embodiments of this application.

The SIM card interface 152 may be configured to connect to a SIM card. The SIM card may be inserted into the SIM card interface 152 or removed from the SIM card interface 152, to implement contact with or separation from the electronic device. The electronic device may support one or N SIM card interfaces, where N is a positive integer greater than 1. The SIM card interface 152 may support a nano SIM card, a micro SIM card, a SIM card, and the like. A plurality of cards may be simultaneously inserted into one SIM card interface 152. The plurality of cards may be of a same type or different types. The SIM card interface 152 may also be compatible with different types of SIM cards. The SIM card interface 152 may also be compatible with an external memory card. The electronic device interacts with a network by using the SIM card, to implement functions such as calling and data communication. In some embodiments, the electronic device uses an eSIM, that is, an embedded SIM card. The eSIM card may be embedded in the electronic device, and cannot be separated from the electronic device.

The USB port 170 is a port that conforms to USB standard specifications. For example, the USB port 170 may include a mini USB port, a micro USB port, or a USB type C port. The USB port 170 may be configured to connect to a charger to charge the electronic device, or may be configured to transmit data between the electronic device and a peripheral device, or may be configured to connect to a headset to play audio through the headset, or may be configured to connect to another electronic device such as an augmented reality (AR) device.

The charging management module 180 is configured to receive a charging input from the charger. The charger may be a wireless charger or a wired charger. In some embodiments of wired charging, the charging management module 180 may receive a charging input from the wired charger through the USB port 170. In some embodiments of wireless charging, the charging management module 180 may receive a wireless charging input through a wireless charging coil of the electronic device. When charging the battery 182, the charging management module 140 may further charge the electronic device through the power management module 181.

The power management module 181 is configured to connect to the battery 182, the charging management module 180, and the processor no. The power management module 181 receives an input of the battery 182 and/or the charging management module 180, and supplies power to the processor no, the internal memory 121, an external memory, the display 151, the camera 153, the mobile communications module 131, the wireless communications module 132, and the like. The power management module 181 may be further configured to monitor parameters such as a battery capacity, a battery cycle count, and a battery health status (electric leakage or impedance). In some other embodiments, the power management module 181 may alternatively be disposed in the processor no. In some other embodiments, the power management module 181 and the charging management module 180 may alternatively be disposed in a same device.

It should be understood that the hardware structure shown in FIG. 1 is merely an example. The electronic device in this embodiment of this application may have more or fewer components than those shown in the figure, may combine two or more components, or may have different component configurations. Various components shown in the figure may be implemented in hardware, software, or a combination of hardware and software including one or more signal processing and/or application-specific integrated circuits.

Figure 2:
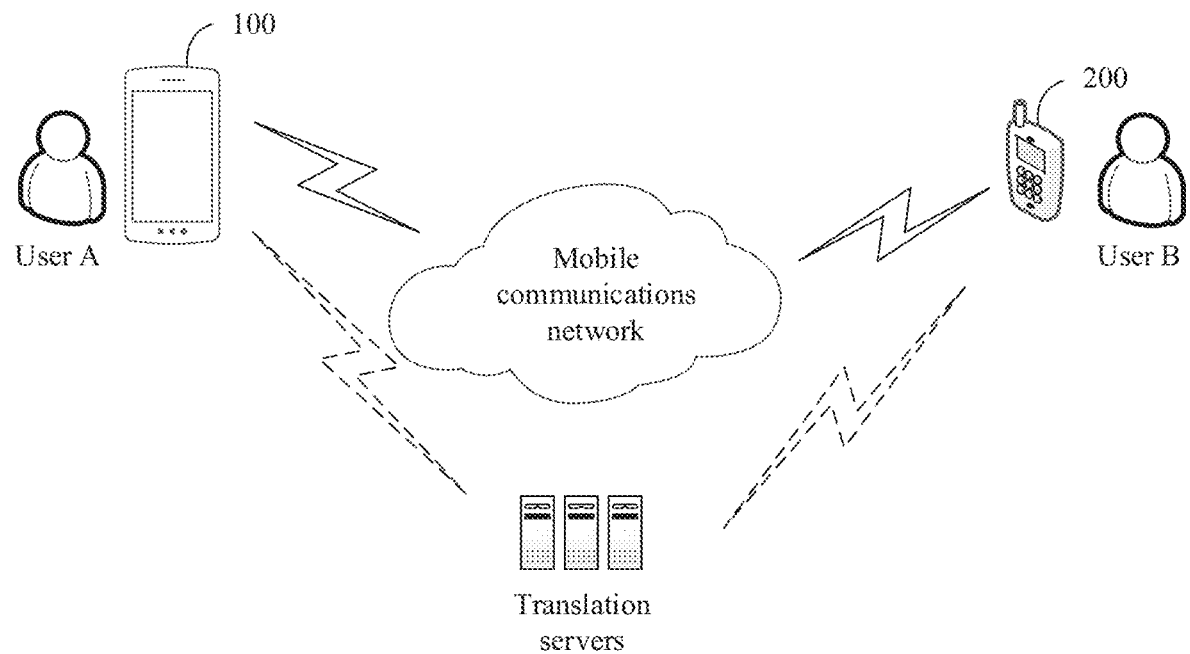
FIG. 2 is a schematic diagram of an architecture of a communications system according to an embodiment of this application.

FIG. 2 is a schematic diagram of an architecture of a communications system to which an embodiment of this application is applicable. Specifically, the architecture of the communications system shown in FIG. 2 includes an electronic device 100, an electronic device 200, and a mobile communications network. The electronic device 100 and the electronic device 200 may communicate with each other through the mobile communications network. The mobile communications network may be a second-generation mobile communications (2nd-generation, 2G) network, a third-generation mobile communications (3rd-generation, 3G) network, a fourth-generation mobile communications (4th-generation, 4G) network, a fifth-generation mobile communications (5th-generation, 5G) network, or the like. It should be noted that, for hardware structures/a hardware structure of the electronic device 100 and/or the electronic device 200, refer to the hardware structure of the electronic device shown in FIG. 1. It should be further noted that the architecture of the communications system shown in FIG. 2 is merely an example, and does not constitute a limitation on a quantity of electronic devices in the communications system shown in FIG. 2.

For example, a user A uses the electronic device 100, and a user B uses the electronic device 200. If the user A uses a language 1 and the user B uses a language 2, when the user A and the user B are in a call, in this embodiment of this application, a speech of the user A may be translated into the language 2 to enable the user B to understand what the user A says, and a speech of the user B may be translated into the language 1 to enable the user A to understand what the user B says.

In some embodiments, at least one of the electronic device 100 and the electronic device 200 may implement dual-end speech translation. To be specific, one electronic device performs a translation function to translate a local-end speech and a peer-end speech. The electronic device 100 is used as an example. In this embodiment of this application, when the user A and the user B are in the call, after collecting the speech of the user A, the electronic device 100 may obtain a translation result of the speech of the user A, and the translation result of the speech of the user A is in the language 2. Then, the electronic device 100 sends the obtained translation result of the speech of the user A to the electronic device 200 through the mobile communications network, so that the electronic device 200 can directly play the speech in the language 2 to the user B. In addition, in some embodiments, the electronic device 100 may further send the speech of the user A to the electronic device 200, and the electronic device 200 may send the collected speech of the user B to the electronic device 100 through the mobile communications network. After receiving the speech of the user B that is sent by the electronic device 200, the electronic device 100 may obtain a translation result of the speech of the user B, and the translation result of the speech of the user B is in the language 1. Then, the electronic device 100 plays the speech in the language 1 to the user A. This helps the user A and the user B communicate with each other when the user A and the user B speak in different languages. In some embodiments, the electronic device 100 may further send the translation result of the speech of the user B to the electronic device 200. An example in which the language 1 is Chinese and the language 2 is English is used. For example, the electronic device 100 collects a speech "Wo shi lu xi, you shen me xu yao bang zhu nin de ma?" of the user A, obtains a translation result "This is Lucy speaking, may I help you?" of the speech of the user A, and sends the speech "This is Lucy speaking, may I help you?" to the electronic device 200, so that the electronic device 200 plays the speech "This is Lucy speaking, may I help you?" to the user B. Therefore, when the user B does not understand Chinese, the user B can understand what the user A means. After collecting a speech "I want to buy a ticket." of the user B, the electronic device 200 sends the speech "I want to buy a ticket." of the user B to the electronic device 100 through the mobile communications network. After receiving the speech "I want to buy a ticket." sent by the electronic device 200, the electronic device 100 obtains a translation result "Wo xiang mai yi zhang piao." of the speech of the user B, and plays the speech "Wo xiang mai yi zhang piao." to the user A. Therefore, when the user A does not understand English, the user A can understand what the user B means.

It should be understood that, in this embodiment of this application, the electronic device 100 may further send the speech of the user A to the electronic device 200 through the mobile communications network, so that the electronic device 200 can play the speech of the user A. After obtaining the translation result of the speech of the user B, the electronic device 100 may further send the translation result of the speech of the user B to the electronic device 200 through the mobile communications network, so that the electronic device 200 can further play the translation result of the speech of the user B. In addition, in some embodiments, after receiving the speech of the user B that is sent by the electronic device 200, the electronic device 100 may further play the speech of the user B to the user A.

That an electronic device performs a translation function may be: The electronic device performs language translation, or the electronic device communicates with a translation server and the translation server performs translation.

For example, in this embodiment of this application, a translation engine may be preconfigured in the electronic device 100, and the translation engine translates the speech of the user A and the speech of the user B. In some other embodiments, to lower a requirement for processing performance of the electronic device 100, the architecture of the communications system shown in FIG. 2 may further include a translation server. The electronic device 100 may further send the speech of the user A and/or the speech of the user B to the translation server. After translating the speech of the user A and/or the speech of the user B, the translation server returns translation results/a translation result to the electronic device 100. It should be noted that a quantity of translation servers included in the structure of the communications system is not limited in this embodiment of this application. A translation server configured to translate the speech of the user A may be the same as or different from a translation server configured to translate the speech of the user B. It can be understood that an electronic device may communicate with a translation server through a mobile communications network or another network such as a WiFi network. It can be understood that a translation result may be in an audio format. A manner of obtaining a translation result is not limited in this application.

Therefore, when an electronic device can implement dual-end speech translation, only one of electronic devices used by two parties in a call needs to support a voice call translation function. However, in an actual call, the electronic devices used by the two parties may both support voice call translation functions. If the electronic devices used by the two parties, for example, the electronic device 100 and the electronic device 200, both support the voice call translation function, to reduce a possibility of repeated translation on each of the speech of the user A and the speech of the user B in a call, the electronic device 100 and the electronic device 200 may perform voice call translation capability negotiation after a communication link is established.

In some embodiments, the electronic device 100 and the electronic device 200 may perform voice call translation capability negotiation after the communication link is established. Therefore, when the electronic device 100 and the electronic device 200 both support the voice call translation functions, if the voice call translation functions of the electronic device 100 and the electronic device 200 are both enabled, the voice call translation function of one of the electronic device 100 and the electronic device 200 is disabled, and the voice call translation function of the other electronic device is still enabled. This helps avoid repeated translation. For example, that the voice call translation function of the electronic device 100 is enabled means that the voice call translation function of the electronic device 100 is in an enabled state. The electronic device 100 may enable the voice call translation function in response to a user operation, or may automatically enable the voice call translation function in response to a language configuration of the electronic device 100, so that the voice call translation function of the electronic device 100 is in an enabled state. When the voice call translation function of the electronic device 100 is in an enabled state and the communication link is established between the electronic device 100 and the electronic device 200, the electronic device 100 may be configured to: obtain the translation result of the speech of the user A that is collected through a microphone or another sound sensor of the electronic device 100; obtain the translation result of the received speech of the user B that is sent by the electronic device 200; and send the translation result of the speech of the user A to the electronic device 200. In some embodiments, when the voice call translation function of the electronic device 100 is in an enabled state, the electronic device 100 may be further configured to send the obtained translation result of the speech of the user B to the electronic device 200. In some other embodiments, when the voice call translation function of the electronic device 100 is in an enabled state, the electronic device 100 may be further configured to convert a speech into a text. For example, the electronic device 100 may convert the collected speech of the user A, the obtained translation result of the speech of the user A, the speech of the user B, and the translation result of the speech of the user B into texts for display. In addition, the electronic device 100 may further send or not send the text into which the speech is converted to the electronic device 200. When the electronic device 100 does not send the text into which the speech is converted to the electronic device 200, the electronic device 200 may perform speech recognition to convert the speech into a text. When the voice call translation function of the electronic device 200 is enabled, for a function that can be implemented by the electronic device 200, refer to the implementation of the electronic device 100.

With reference to the architecture of the communications system shown in FIG. 2, the following describes in detail a method in which the electronic device 100 and the electronic device 200 perform voice call translation capability negotiation.

Figure 3:
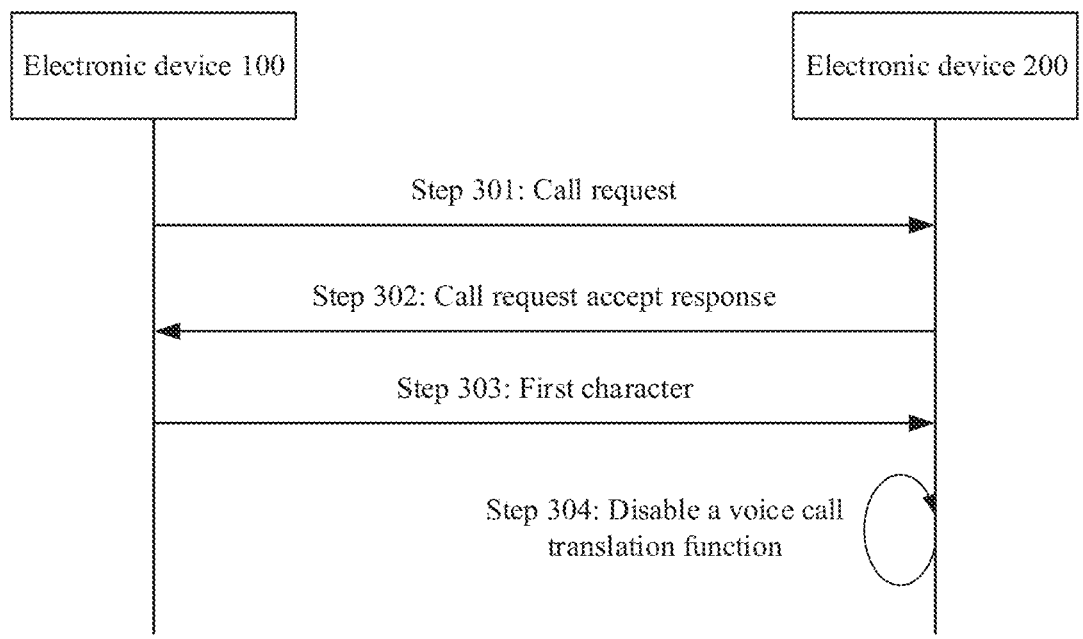
FIG. 3 is a schematic flowchart of a voice call translation capability negotiation method according to an embodiment of this application.

FIG. 3 is a schematic flowchart of a voice call translation capability negotiation method according to an embodiment of this application. The method specifically includes the following steps.

Step 301: An electronic device 100 sends a call request to an electronic device 200.

Figures 1, 4A:
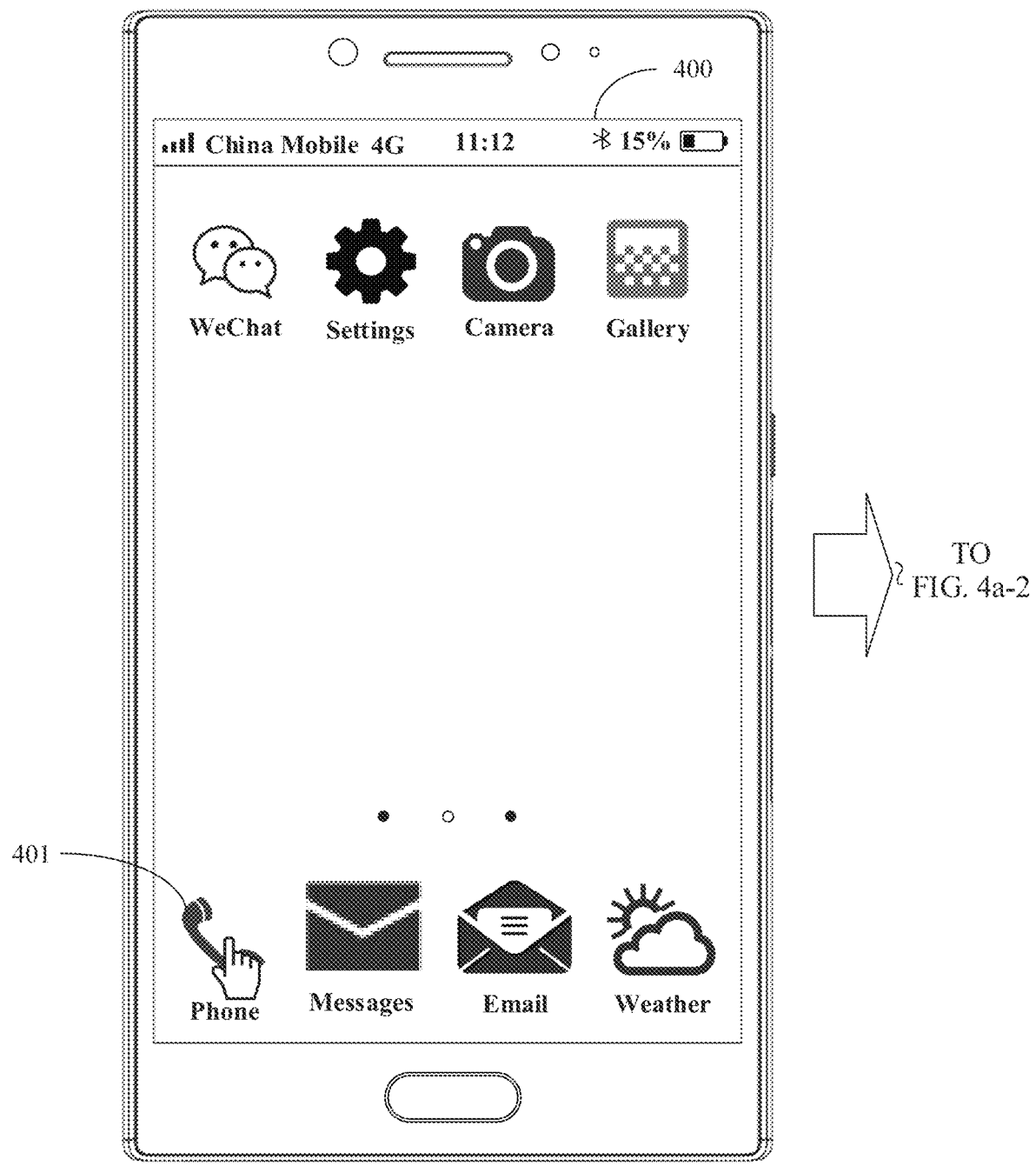
Figures 2, 4A:
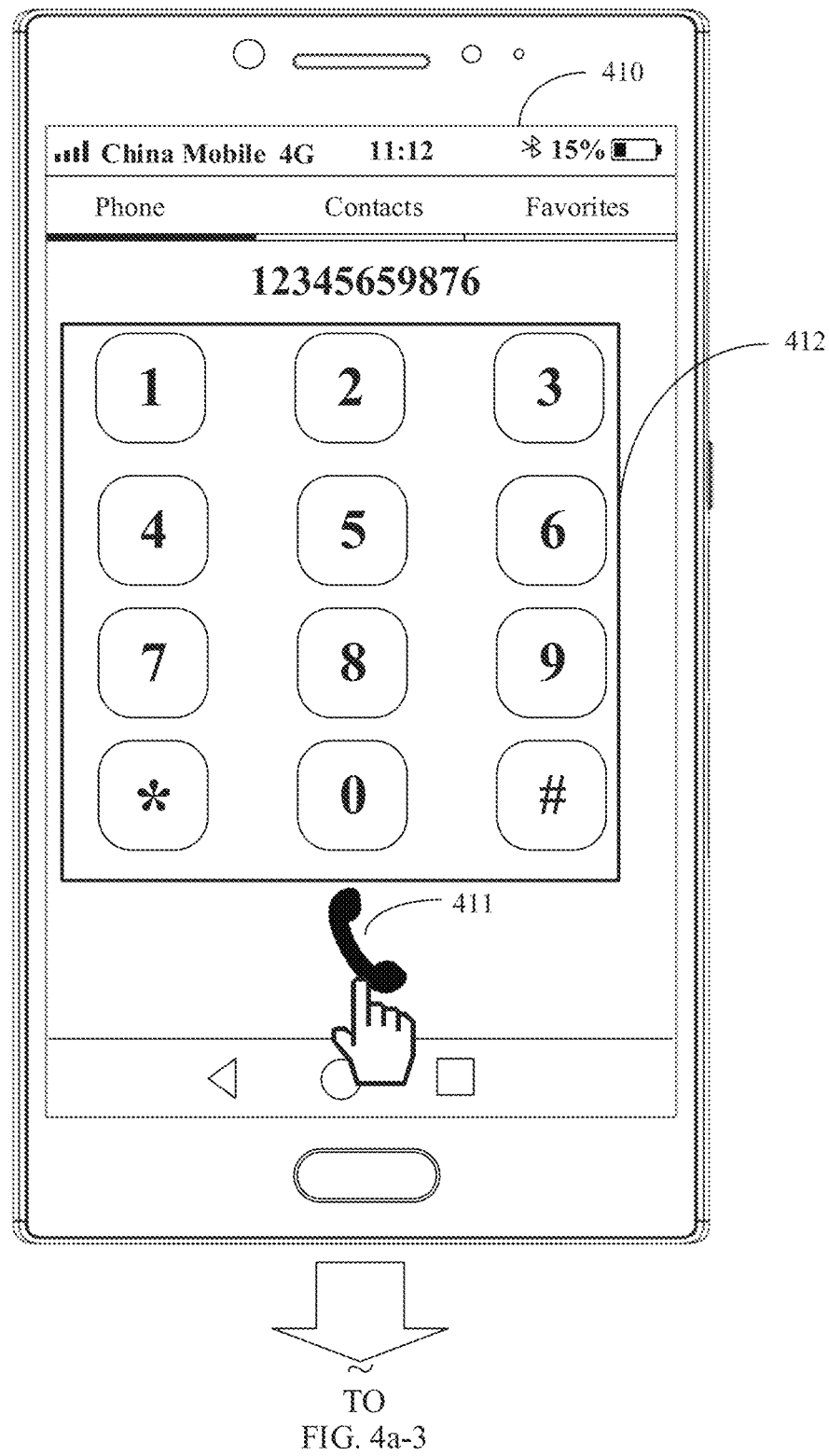
Figures 3, 4A:
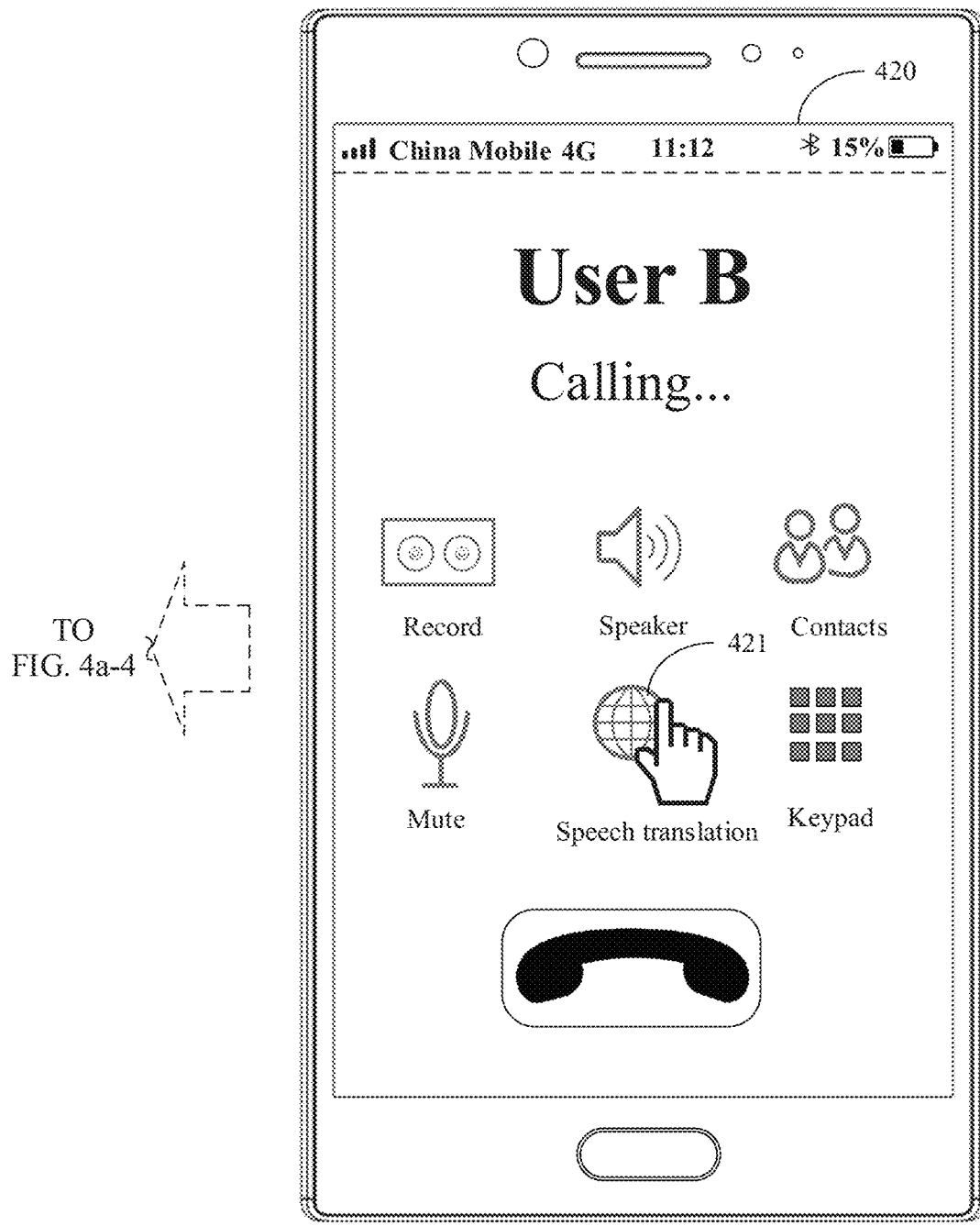

A user A uses the electronic device 100, and a user B uses the electronic device 200. For example, as shown in FIG. 4a-1, the electronic device 100 displays a user interface 400. The user interface 400 includes an icon 401 of Phone. In some other embodiments, the user interface 400 may further include an icon of another application, for example, an icon of WeChat, an icon of Settings, or an icon of Camera. The electronic device 100 may display a user interface 410 on a display in response to an operation performed on the icon 401 of Phone. The user interface 410 includes a dial keyboard 412. The user may enter a phone number of the user B by tapping a corresponding symbol included in the dial keyboard 412. For example, the user interface 410 includes the entered phone number "12345659876" of the user B. In response to an operation performed on a dial button 411, the electronic device 100 sends the call request to the electronic device 200, and displays a user interface 420. For another example, when the electronic device 100 stores the phone number of the user B, in response to an operation performed on the user B in Contacts, the electronic device 100 may send the call request to the electronic device 200, and display the user interface 420 on the display. For another example, in response to a speech instruction "Call the user B", the electronic device 100 may send the call request to the electronic device 200, and display the user interface 420 on the display. In this embodiment of this application, the user may alternatively perform another operation on the electronic device, so that the electronic device 100 sends the call request to the electronic device 200.

It should be noted that, when the electronic device 100 supports a voice call translation function, to facilitate interaction between the user and the electronic device 100, in some embodiments, the user interface 420 may further include a speech translation button 421. For example, the electronic device 100 may activate the speech translation button 421 on the user interface 420 in response to an operation that the user A calls the user B, so that the user can operate the speech translation button 421. In some other embodiments, when the electronic device 100 supports the voice call translation function, the electronic device 100 may alternatively activate the speech translation button 421 on the user interface 420 after completing establishment of a communication link with the electronic device 200. When the electronic device 100 does not complete establishment of the communication link with the electronic device 200, the electronic device 100 does not activate the speech translation button 421 on the user interface 420. For example, that the speech translation button 421 is not activated may be manifested as that the speech translation button 421 is grayed out, and consequently the user cannot operate the speech translation button 421, or be manifested as that the speech translation button 421 is not displayed on the user interface 420. When the electronic device 100 does not support the voice call translation function, the user interface 420 may not include the speech translation button 421, or the speech translation button 421 may be set to be disabled, and consequently the user cannot operate the speech translation button 421. In some embodiments, after activating the speech translation button 421, the electronic device 100 may enable or disable the voice call translation function of the electronic device 100 in response to an operation performed by the user on the speech translation button 421. When the speech translation button 421 is on (ON), the speech call translation function of the electronic device 100 is in an enabled state; or when the speech translation button 421 is off (OFF), the speech call translation function of the electronic device 100 is in a disabled state.

In some other embodiments, the electronic device 100 may further display a user interface 430 on the display in response to the operation performed on the speech translation button 421. The user interface 430 includes a speech translation button 431. The electronic device 100 may enable or disable the voice call translation function of the electronic device 100 in response to an operation performed on the speech translation button 431. In addition, to help the user perform language setting, in some embodiments, the user interface 430 further includes a local-end language setting button 432 and a peer-end language setting button 433. It should be understood that the local-end language setting button 432 is used to set a language used by the user A, and the peer-end language setting button 432 is used to set a language used by the user B.

Step 302: After receiving the call request sent by the electronic device 100, the electronic device 200 sends a call request accept response to the electronic device 100.

Figures 4, 4A:
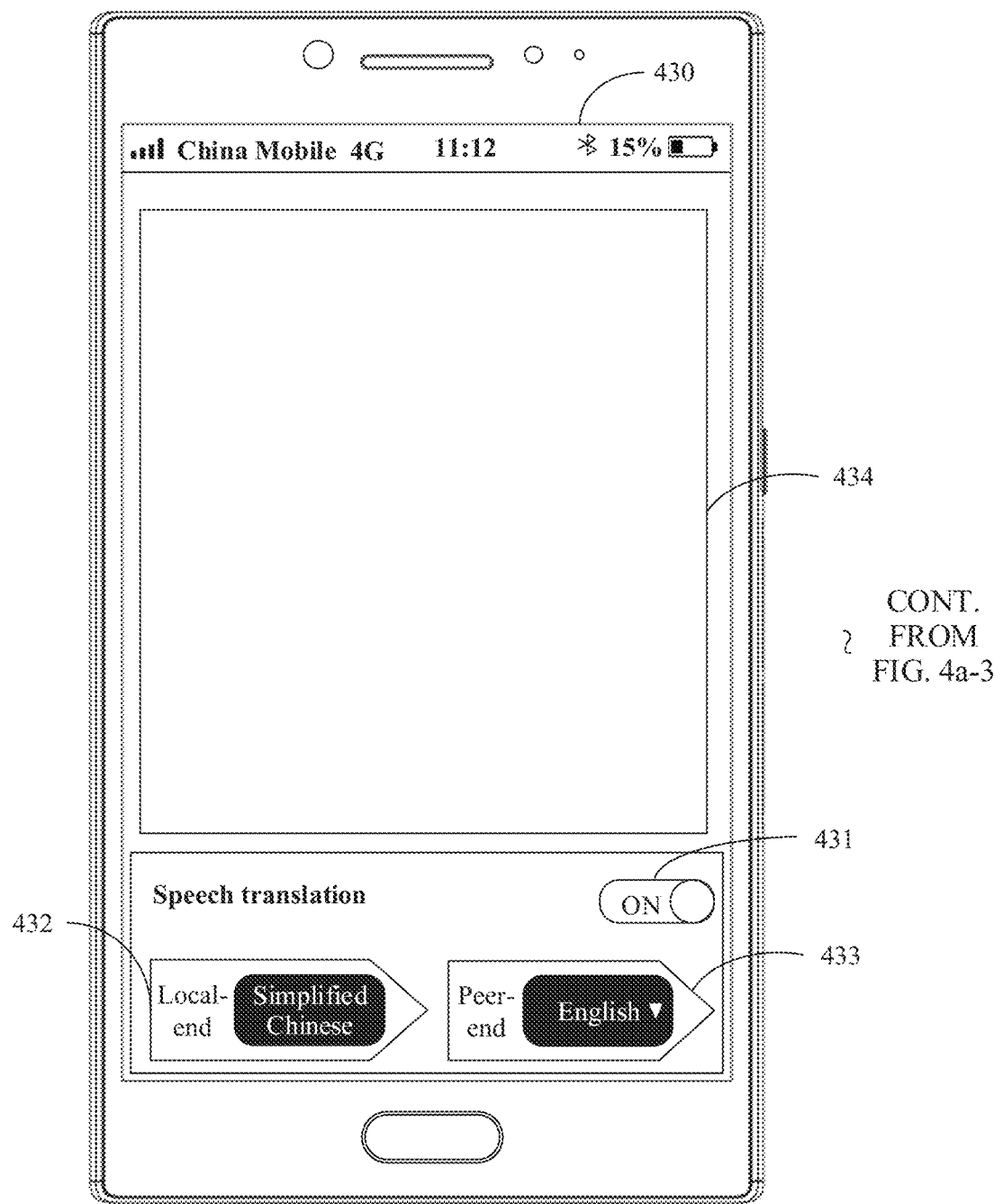
Figures 1, 4B:
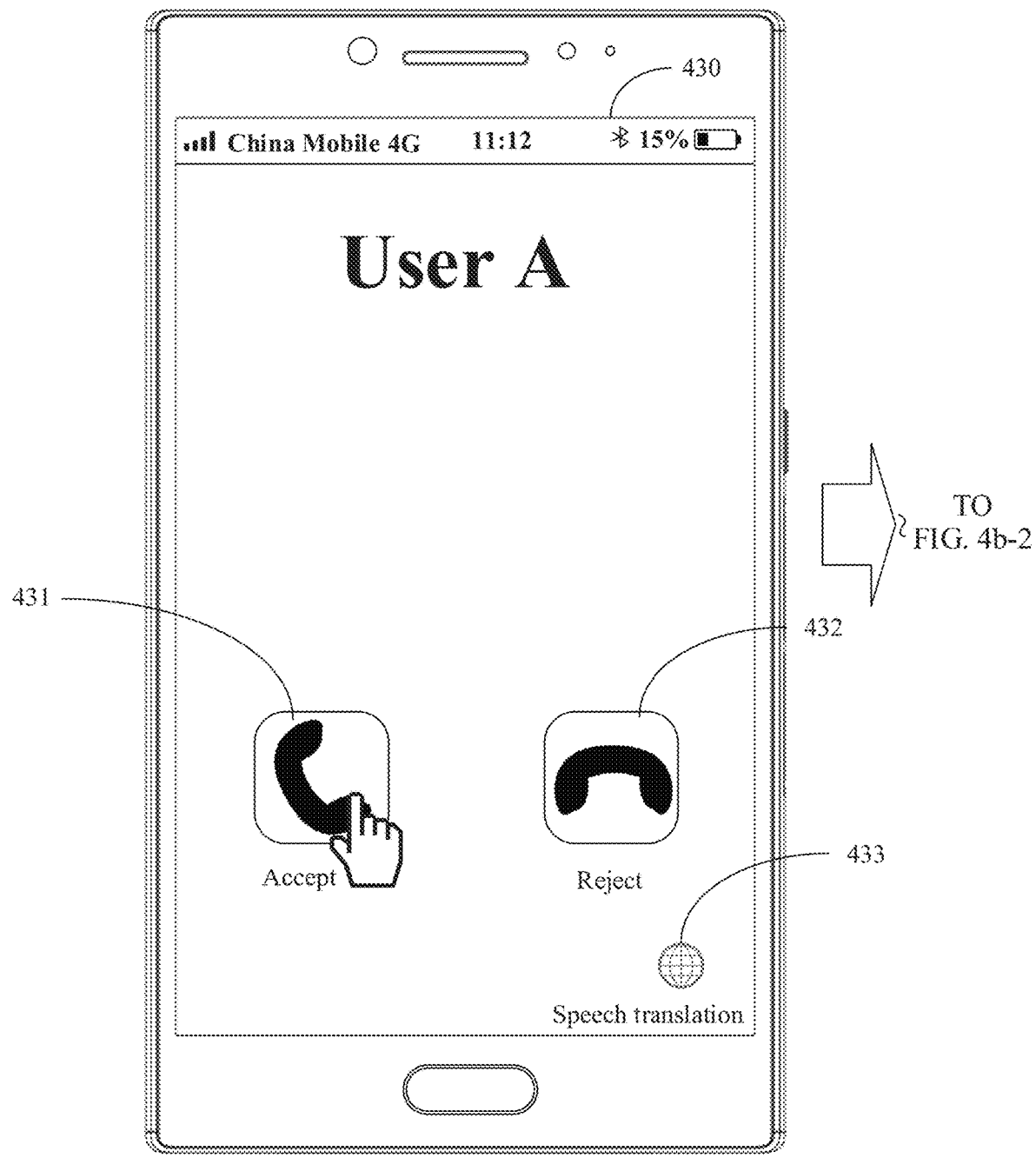
Figures 2, 4B:
Figures 3, 4B:
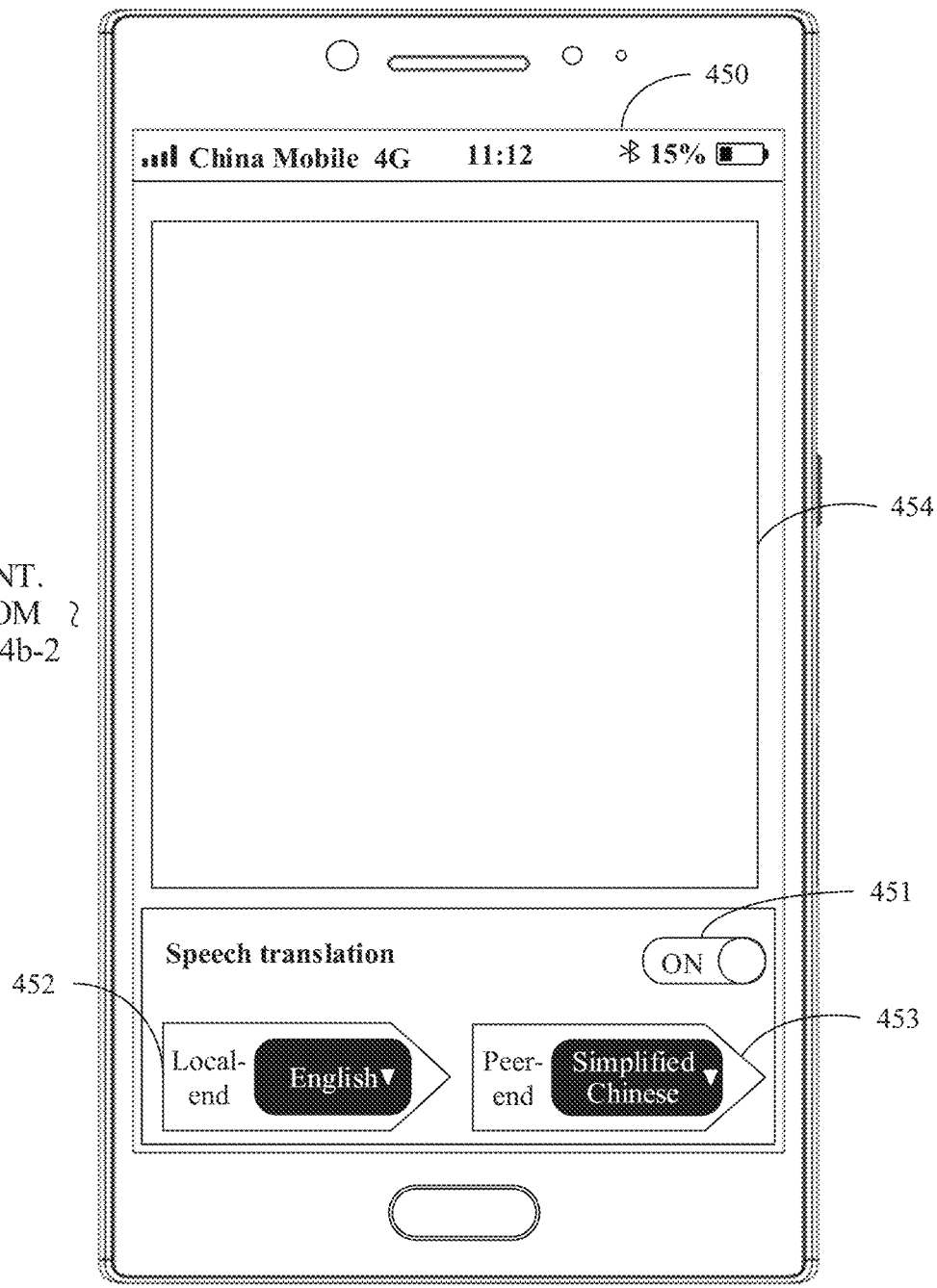

For example, as shown in FIG. 4b-1, after receiving the call request of the electronic device 100, the electronic device 200 displays a user interface 430 on a display in response to the call request of the electronic device 100. The user interface 430 includes an accept button 431 and a reject button 432. In response to an operation performed on the accept button 431, the electronic device 200 sends the call request receive response to the electronic device 100, and displays a user interface 440 on the display. In some embodiments, when the electronic device 200 supports a voice call translation function, to help the user enable or disable the voice call translation function of the electronic device 200, the user interface 430 may further include a speech translation button 433, so that the user B can enable or disable the voice call translation function before accepting the call request of the electronic device 100. For an implementation in which the electronic device 200 responds to an operation performed on the speech translation button 433, refer to the implementation in which the electronic device 100 responds to the operation performed on the speech translation button 421 in this embodiment of this application. In some other embodiments, before responding to the operation that the user accepts the call request of the electronic device 100, the electronic device 200 does not activate the voice call translation function, and consequently the user cannot enable or disable the voice call translation function. In this case, the user interface 430 may not include the speech translation button 433. Alternatively, the user interface 430 includes the speech translation button 433, but the speech translation button 433 is grayed out, and consequently the user cannot perform an operation. After responding to the operation that the user accepts the call request of the electronic device 100, the electronic device 200 activates the voice call translation function, so that the user can enable or disable the voice call translation function.

For example, the electronic device 100 is a calling party, and the electronic device 200 is a called party. When the electronic device 100 and the electronic device 200 both support the voice call translation functions, before the call link is established, only the speech translation button of the calling party may be activated, and the speech translation button of the called party is not activated. To be specific, before the call link is established, only the user of the calling party can operate the speech translation button after initiating a call, to enable the voice call translation function of the calling party, and the user of the called party cannot operate the speech translation button of the called party to enable the voice call translation function of the called party. In this way, before the call link is established, the electronic device 100 and the electronic device 200 are prevented from both enabling speech translation functions.

In addition, when the electronic device 200 does not support the voice call translation function, the user interface 430 may not include the speech translation button 433, or the speech translation button 433 may be grayed out.

For another example, after receiving the call request sent by the electronic device 100, the electronic device 200 may alternatively send the call request accept response to the electronic device 100 in response to a speech instruction for answering the call of the user A. A manner of triggering to send the call request accept response to the electronic device 100 is not limited in this embodiment of this application.

It should be noted that the communication link may be established between the electronic device 100 and the electronic device 200 through the call request and the call request accept response.

In addition, it should be further noted that the electronic device 200 may further display the user interface 440 on the display in response to the operation of accepting the call request of the electronic device 100. In this embodiment of this application, when the electronic device 200 supports the voice call translation function, to facilitate interaction between the user and the electronic device 200, the user interface 440 may further include a speech translation button 441 in some embodiments. When the electronic device 200 does not support the voice call translation function, the user interface 440 may not include the speech translation button 441, or the speech translation button 441 may be grayed out. In addition, for a function of the speech translation button 441 in this embodiment of this application, refer to the function of the speech translation button 421 shown in FIG. 4a-3.

In some embodiments, to help the user B perform language setting, a user interface 450 shown in FIG. 4b-3 may further include a local-end language setting button 452 and a peer-end language setting button 453. The local-end language setting button 452 may be used to set the language used by the user B, and the peer-end language setting button 453 may be used to set the language used by the user A.

In this embodiment of this application, the electronic device 100 and the electronic device 200 may perform voice call translation capability negotiation after the communication link is established. An example in which the electronic device 100 initiates voice call translation capability negotiation is used below for detailed descriptions. After receiving the call request accept response and establishing the communication link with the electronic device 200, the electronic device 100 performs step 303. It can be understood that the electronic device 100 may enable the speech translation function before the communication link is established, and needs to perform voice call translation capability negotiation with the electronic device 200 after the communication link is established. Alternatively, the electronic device 100 may enable the speech translation function after the communication link is established, or may automatically enable the speech translation function, or may enable the speech translation function in response to a user operation after the communication link is established.

Step 303: The electronic device 100 sends a first character to the electronic device 200, where the first character is used to indicate that the voice call translation function of the electronic device 100 is enabled. For example, the electronic device 100 may send the first character to the electronic device 200 in a form of a DTMF tone. For example, the first character may be 1, 0, or another positive integer, or may be # or *.

When the voice call translation function is enabled before the electronic device 200 receives the first character, the electronic device 200 performs step 304.

Step 304: The electronic device 200 automatically disables the voice call translation function.

For example, in the user interface 450 shown in FIG. 4b-3, after receiving the first character, the electronic device 200 automatically switches a speech translation button 451 from an on (ON) state to an off (OFF) state.

Therefore, according to the foregoing technical solution, the electronic device 100 and the electronic device 200 can implement voice call translation capability negotiation. This helps avoid repeated translation and reduce a possibility of an error.

Figure 5A:
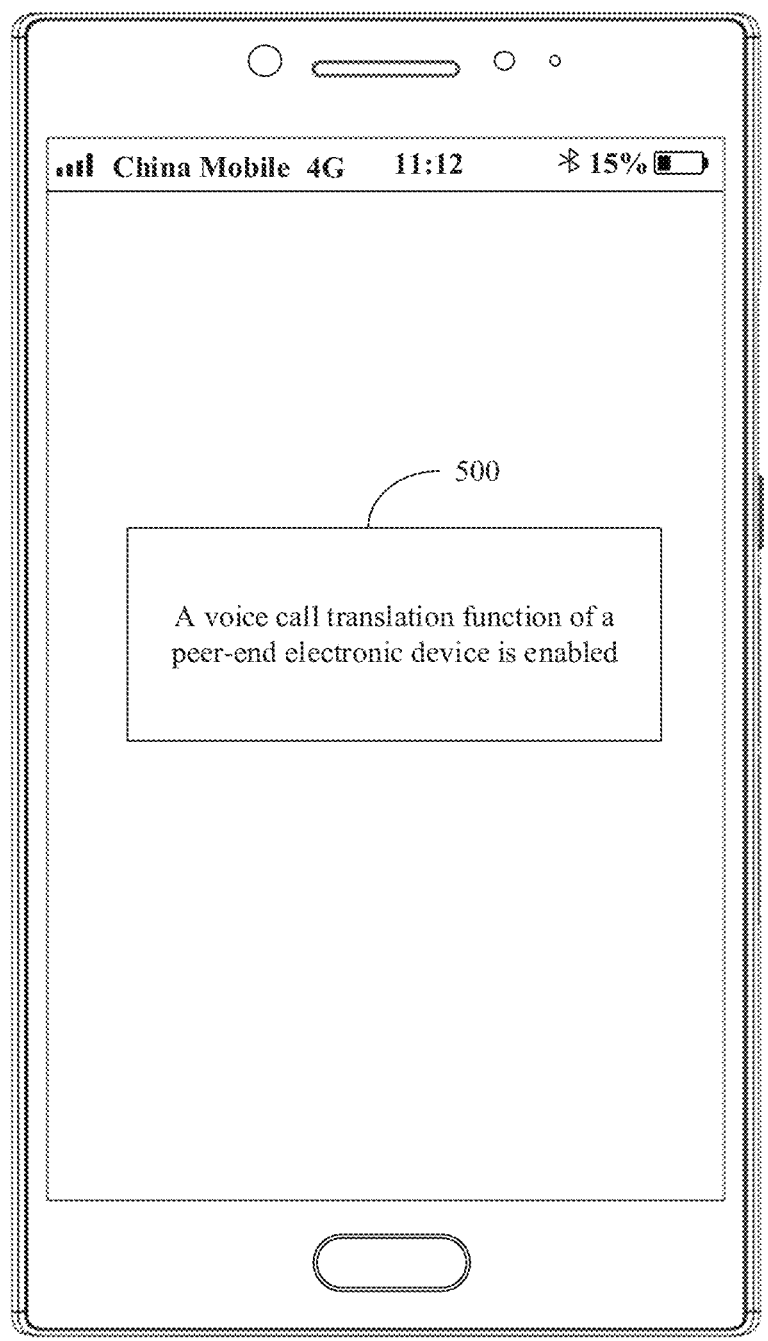
FIG. 5a is a schematic diagram of prompting that a voice call translation function is enabled according to an embodiment of this application.

To help the user know a status in which the electronic device 200 automatically disables the voice call translation function, in some embodiments, after receiving the first character, the electronic device 200 further prompts the user that the voice call translation function of the electronic device 100 is enabled. For example, the electronic device 200 may prompt, in a voice form, the user that the voice call translation function of the electronic device 100 is enabled. For another example, the electronic device 200 may display first prompt information on the display, and the first prompt information is used to prompt the user that the voice call translation function of the electronic device 100 is enabled. For example, as shown in FIG. 5a, after receiving the first character, the electronic device 200 may display a prompt box 600 on the display. The prompt box 600 includes the first prompt information. The first prompt information may be that the voice call translation function of the peer-end electronic device is enabled.

Figure 5B:
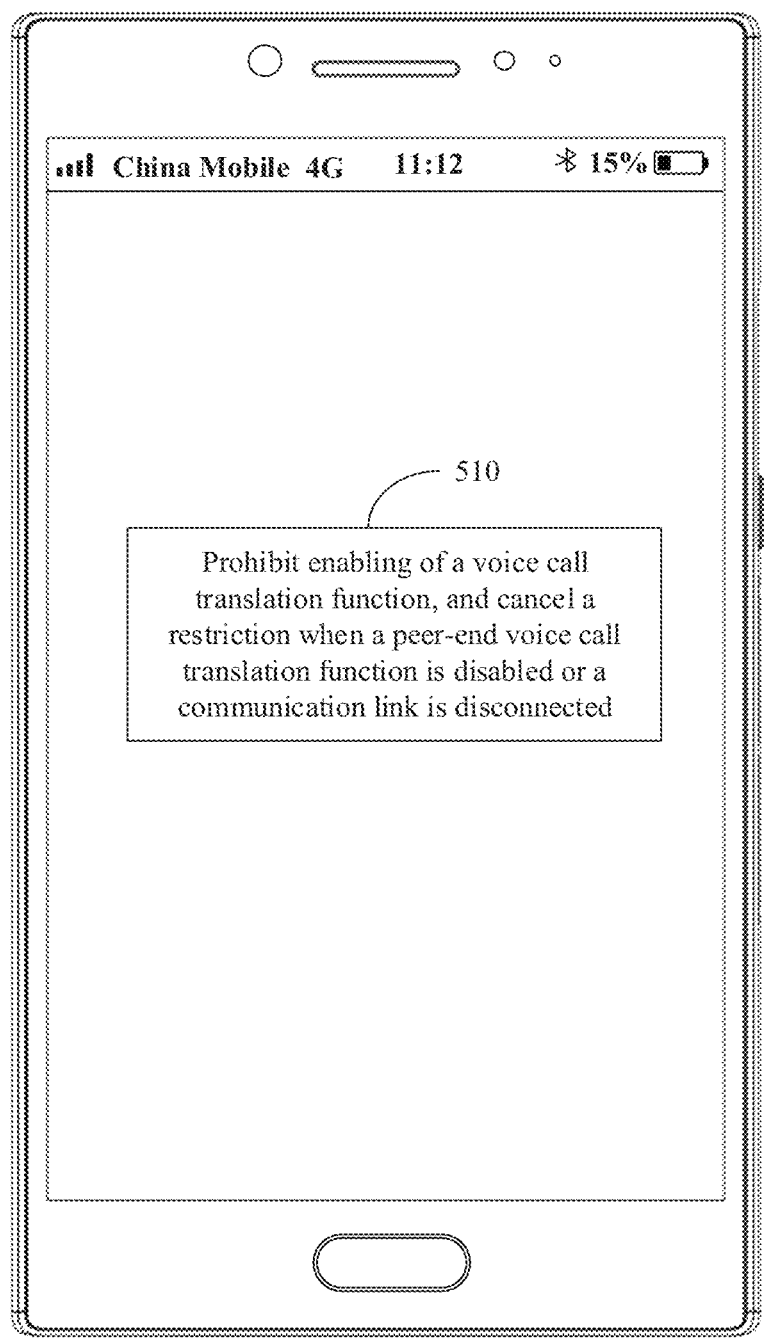
FIG. 5b is another schematic diagram of prompting that a voice call translation function is restricted according to an embodiment of this application.

To improve reliability of voice call translation in a voice call between the user A and the user B, after automatically disabling the voice call translation function, the electronic device 200 may further prohibit the user from enabling the voice call translation function. The user interface 440 shown in FIG. 4b-2 is used as an example. To prohibit the user from enabling the voice call translation function, the electronic device 200 may set the speech translation button 441 to be grayed out or hide the speech translation button 441. The electronic device 200 may receive, in the call, a notification that is sent by the electronic device 100 and that indicates that the voice call translation function of the electronic device 100 is disabled. Alternatively, after the communication link with the electronic device 100 is disconnected, the electronic device 200 cancels the restriction on enabling the voice call translation function of the electronic device 200 by the user. The user interface 440 shown in FIG. 4b-2 is used as an example. That the electronic device 200 cancels the restriction imposed by the user on enabling of the voice call translation function of the electronic device 200 may be manifested as that the speech translation button 441 is activated, so that the user can operate the speech translation button 411 to enable or disable the voice call translation function of the electronic device 200. To improve interaction between the user and the electronic device 200, in some embodiments, after prohibiting the user from enabling the voice call translation function, the electronic device 200 further prompts the user that the voice call translation function is prohibited from being enabled. In some other embodiments, after prohibiting the user from enabling the voice call translation function, in addition to prompting the user that the voice call translation function is prohibited from being enabled, the electronic device 200 further prompts the user with an occasion of cancelling the restriction imposed on enabling of the voice call translation function. For example, in a voice form, the electronic device 200 may prompt the user that the voice call translation function is prohibited from being enabled, and prompt the user with the occasion of cancelling the restriction imposed on enabling of the voice call translation function. For another example, the electronic device 200 may prompt the user by displaying second prompt information on the display, and the second prompt information is used to prompt the user that the voice call translation function is prohibited from being enabled and prompt the occasion of cancelling the restriction imposed on enabling of the voice call translation function. For example, as shown in FIG. 5b, the electronic device 200 may prompt the user by displaying a prompt box 510 on the display. The prompt box 510 includes the second prompt information. For example, when the occasion of cancelling the restriction imposed on enabling of the voice call translation function is that the voice call translation function of the electronic device 100 is disabled or the communication link is disconnected, the second prompt information may be that the voice call translation function is prohibited from being enabled, and the restriction is canceled when the voice call translation function of the peer end is disabled or the communication link is disconnected.

It should be noted that, in this embodiment of this application, the electronic device 200 may prompt the user with the first prompt information and the second prompt information after automatically disabling the voice call translation function, or the electronic device 200 may prompt the user with the first prompt information after receiving the first character, and prompt the user with the second prompt information after disabling the voice call translation function. This is not limited.

In addition, to enable the electronic device 100 to determine that voice call translation capability negotiation is completed, in some embodiments, the electronic device 200 may further send a second character to the electronic device 100. The second character is used to indicate that the voice call translation function of the electronic device 200 is disabled. After receiving the second character, the electronic device 100 determines that voice call translation capability negotiation is completed. For example, the electronic device 200 may send the second character to the electronic device 100 in a form of a DTMF tone. The second character may be a character other than the first character. For example, if the first character is 1, the second character may be 2 or a positive integer other than 1, or may be # or *.

It should be noted that functions of the first character and the second character in this embodiment of this application may be agreed on in advance in a form of a communication protocol.

After receiving the second character sent by the electronic device 200, the electronic device 100 may further play, in a language 1, a prompt tone indicating that the voice call translation function is enabled, and send, to the electronic device 200, a prompt tone that is in a language 2 and that indicates that the voice call translation function is enabled. For example, when the language 1 is Chinese, the text of the prompt tone indicating that the translation function is enabled may be "Huan ying shi yong yu yin tong hua fan yi gong neng, zai yu yin bo bao wan bi hou kai shi tong hua."

An example in which the electronic device 100 initiates voice call translation capability negotiation is used above. For a method in which the electronic device 200 initiates voice call translation capability negotiation, refer to steps 303 and 304.

If only one of the electronic device 100 and the electronic device 200 enables the voice call translation function, after the communication link is established, the electronic device that enables the voice call translation function initiates voice call translation capability negotiation with the other electronic device.

For example, the electronic device 100 enables the voice call translation function, and the electronic device 200 does not support or does not enable the voice call translation function. After the communication link between the electronic device 100 and the electronic device 200 is established, the electronic device 100 sends the first character to the electronic device 200, and the first character is used to indicate that the voice call translation function of the electronic device 100 is enabled. For example, the electronic device 100 may send the first character to the electronic device 200 in a form of a dual-tone multifrequency (dual tone multi frequency, DTMF) tone. For example, the first character may be 1, 0, or another positive integer, or may be # or *. Because the electronic device 200 does not support or does not enable the voice call translation function, the electronic device 200 cannot identify the first character. Therefore, in some embodiments, the electronic device 200 does not respond to the received first character sent by the electronic device 100. If the electronic device 100 does not receive the response from the electronic device 200 within preset duration, the electronic device 100 determines that the electronic device 200 does not enable or does not support the voice call translation function. In some other embodiments, when the electronic device 200 cannot identify the first character, the electronic device 200 may send a target character to the electronic device 100. For example, the target character may be a preset character that is different from the first character. For example, the electronic device 200 may send the target character to the electronic device 100 in a form of a DTMF tone. After receiving the target character, the electronic device 100 determines that the electronic device 200 does not enable or does not support the voice call translation function.

For a method in which the electronic device 100 and the electronic device 200 perform voice call translation capability negotiation when the electronic device 100 does not support or disables the voice call translation function and the voice call translation function of the electronic device 200 is enabled, refer to the method in which the electronic device 100 and the electronic device 200 perform voice call translation capability negotiation when the electronic device 100 enables the voice call translation function and the electronic device 200 does not support or disables the voice call translation function.

When the electronic device 100 and the electronic device 200 both support the voice call translation functions, if the electronic device 100 and the electronic device 200 both enable the voice call translation functions before the communication link is established, in some embodiments, one of the electronic device 100 and the electronic device 200 that first completes establishment of the communication link may initiate voice call translation capability negotiation, or a calling party may initiate voice call translation capability negotiation, or a called party may initiate voice call translation capability negotiation, or the like. An electronic device that initiates voice call translation capability negotiation is not limited in this embodiment of this application. If the electronic device 100 and the electronic device 200 enable the speech translation functions at the same time after the communication link is established, which does not often happen, in some embodiments, either of the electronic device 100 and the electronic device 200 may initiate voice call translation capability negotiation, or a calling party may initiate voice call translation capability negotiation, or a called party may initiate voice call translation capability negotiation, or the like. An electronic device that initiates voice call translation capability negotiation is not limited in this embodiment of this application.

When the electronic device 100 and the electronic device 200 both support the speech translation functions, in some embodiments, a calling party may automatically enable the voice call translation function and initiate voice call translation capability negotiation, or a called party may automatically enable the voice call translation function and initiate voice call translation capability negotiation, or the like. An electronic device that initiates voice call translation capability negotiation is not limited in this embodiment of this application.

It should be noted that, in this embodiment of this application, when the electronic device 100 and/or the electronic device 200 support/supports the voice call translation function, the electronic device 100 and/or the electronic device 200 may automatically enable the voice call translation functions/the voice call translation function, or may enable the voice call translation functions/the voice call translation function in response to a user operation.

The electronic device 100 is used as an example. After the electronic device 100 initiates a call to the electronic device 200, in some embodiments, the electronic device 100 may determine, based on a language used by the user A and a language used by the user B in a call record, whether to automatically enable the voice call translation function. The electronic device 100 automatically enables the voice call translation function when the language used by the user A and the language used by the user B in the call record are different. For another example, the electronic device 100 may automatically enable the voice call translation function when a preset local-end language is different from a preset peer-end language. For another example, the electronic device 100 may automatically enable the voice call translation function when a native language of a home location of a phone number of the user A is different from a native language of a home location of the phone number of the user B.

Figure 6A:
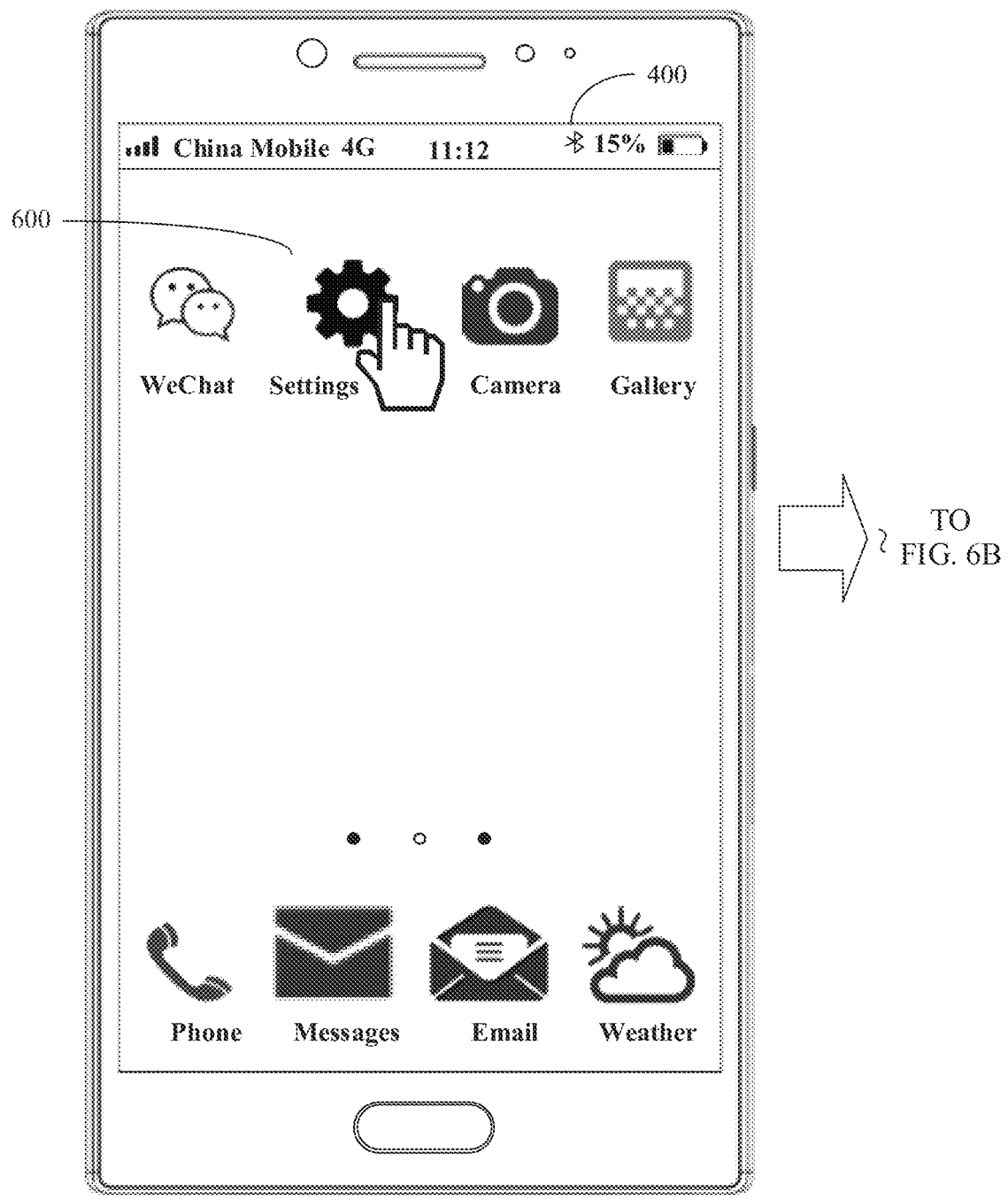
FIG. 6A to FIG. 6C are a schematic diagram of a system language setting according to an embodiment of this application.
Figure 6B:
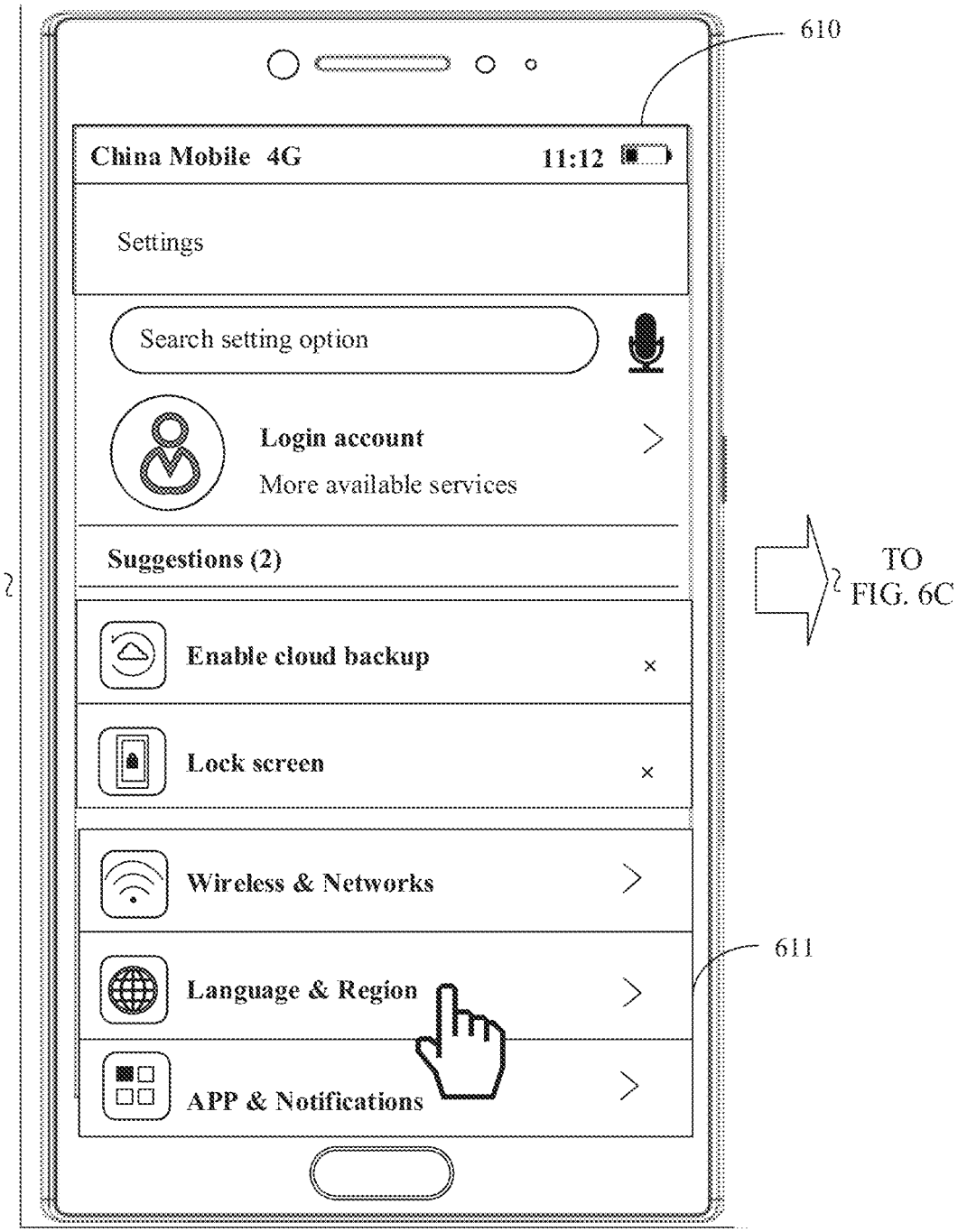
Figure 6C:
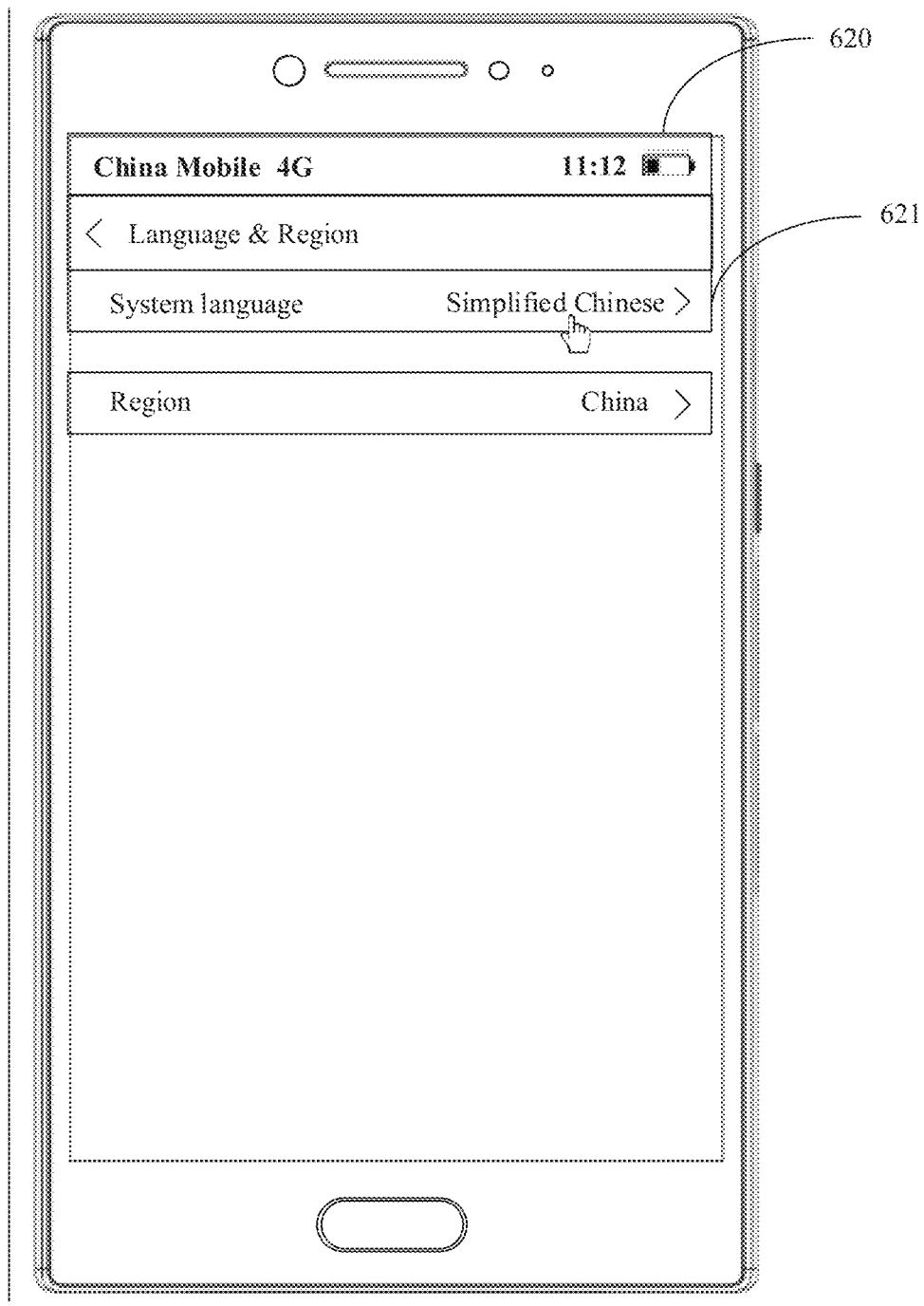

In some embodiments, a user may set a local-end language by setting a system language. For example, as shown in FIG. 6A, the display of the electronic device 100 displays the user interface 400. The user interface 400 includes an icon 600 of Settings. In addition, the user interface 400 may further include an icon of another application, for example, the icon of Camera or the icon of WeChat. The electronic device 100 may display a system setting interface 610 on the display in response to an operation performed on the icon 600 of Settings. The system setting interface 610 includes a language and region setting button 611. It should be understood that the system setting interface 610 may further include a plurality of other setting buttons, for example, a cloud backup enabling button and a screen locking button. The electronic device 100 displays a user interface 620 on the display in response to an operation performed on the language and region setting button 611. The user interface 620 includes a system language setting button 621. The user may operate the system language setting button to set a system language. For example, if the system language is set to simplified Chinese on the user interface 600 shown in FIG. 6C, the electronic device 100 determines that a local-end language is simplified Chinese. After the electronic device 100 receives a speech of the user B that is sent by the electronic device 200, a language of an obtained translation result of the speech of the user B is simplified Chinese.

Figure 7A:
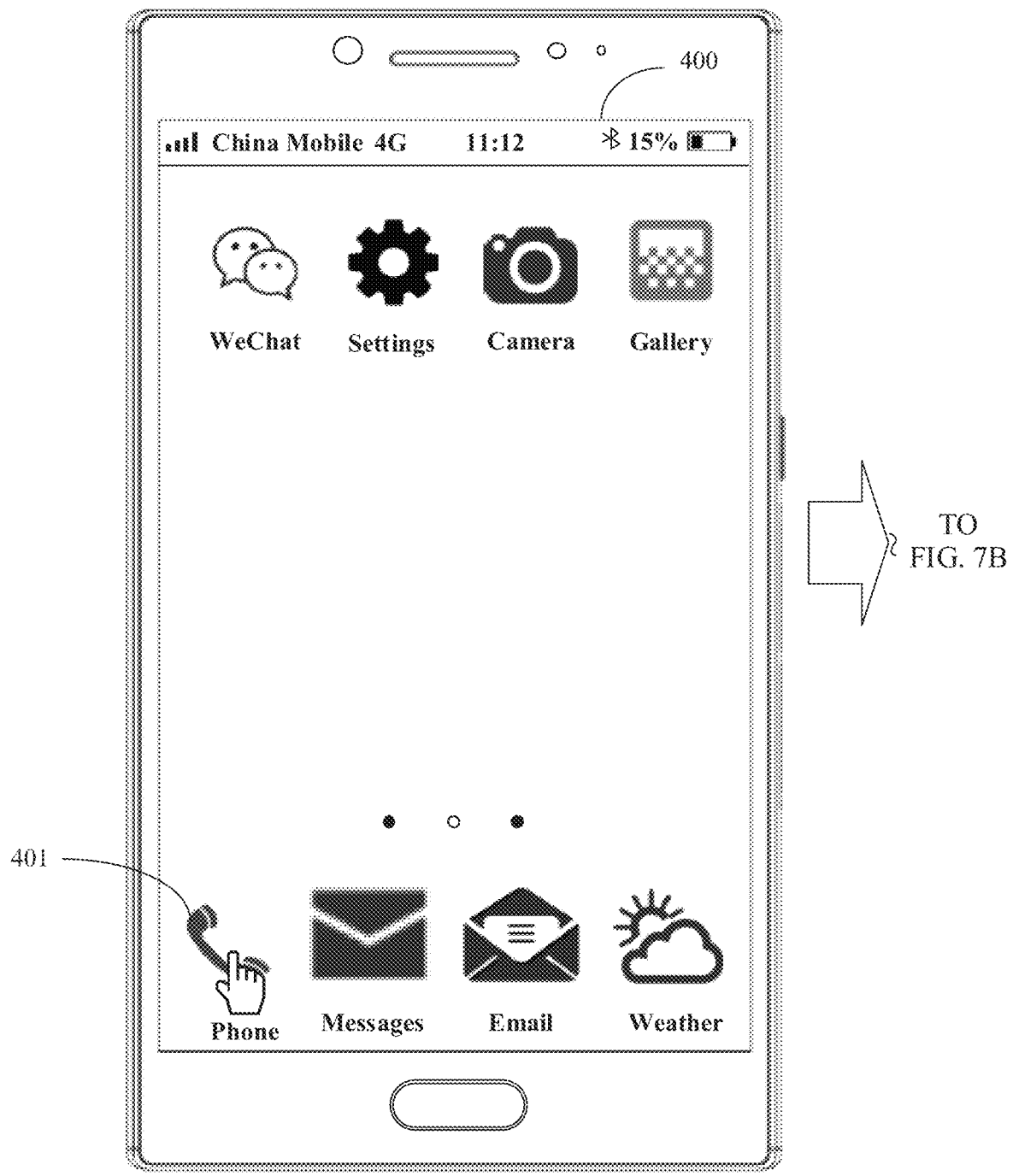
FIG. 7A to FIG. 7C are a schematic diagram of a peer-end language setting according to an embodiment of this application.
Figure 7B:
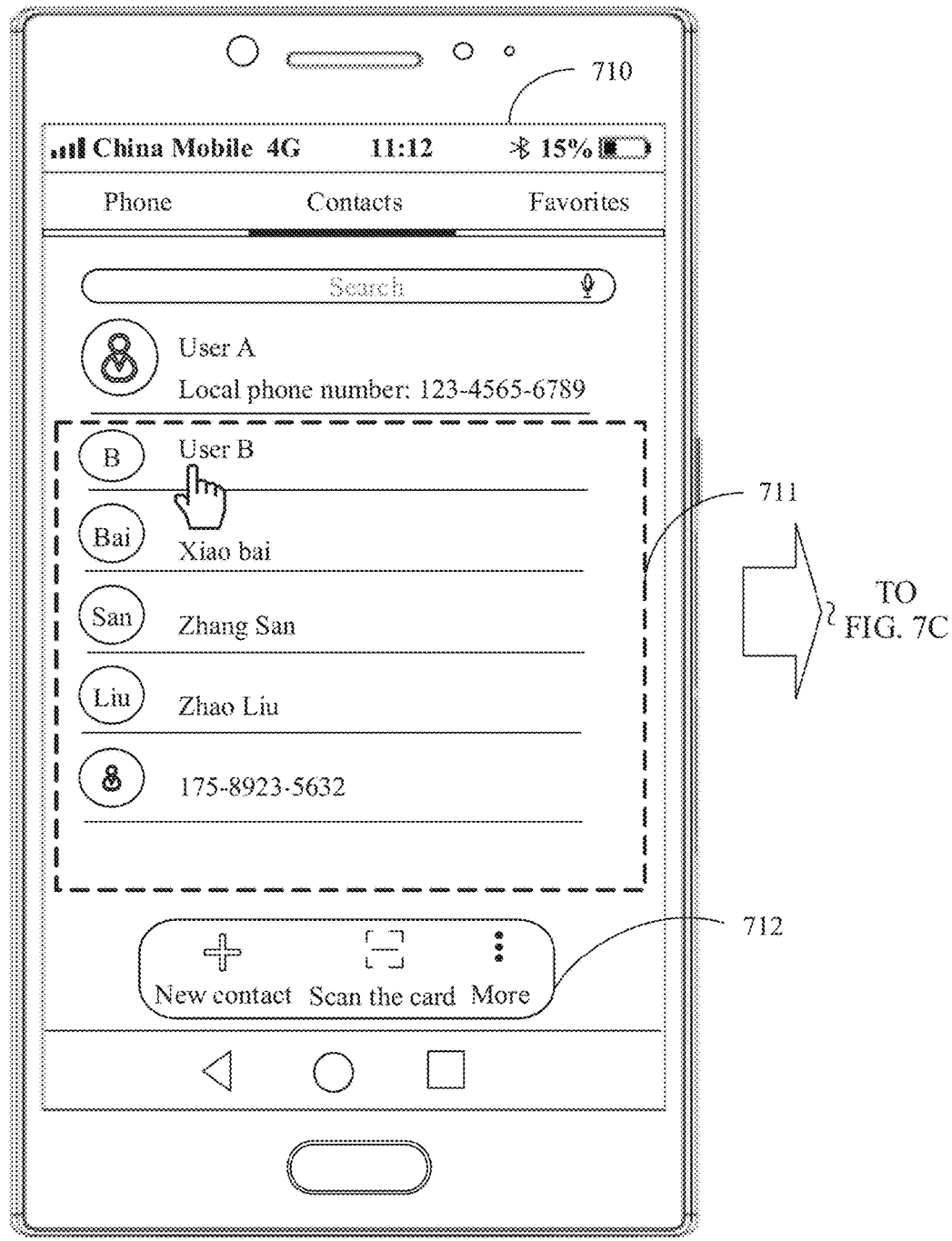
Figure 7C:
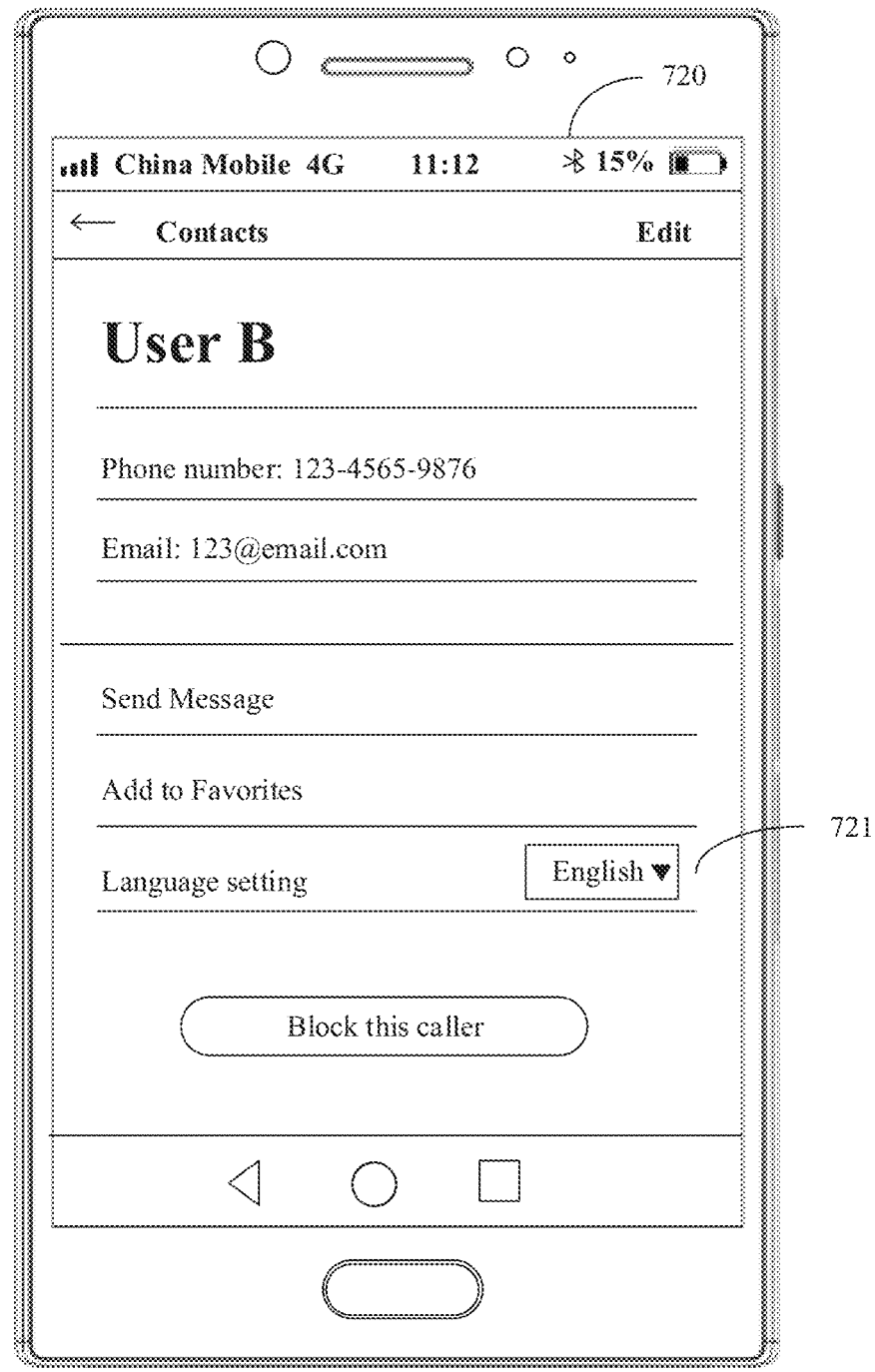
Figure 8:
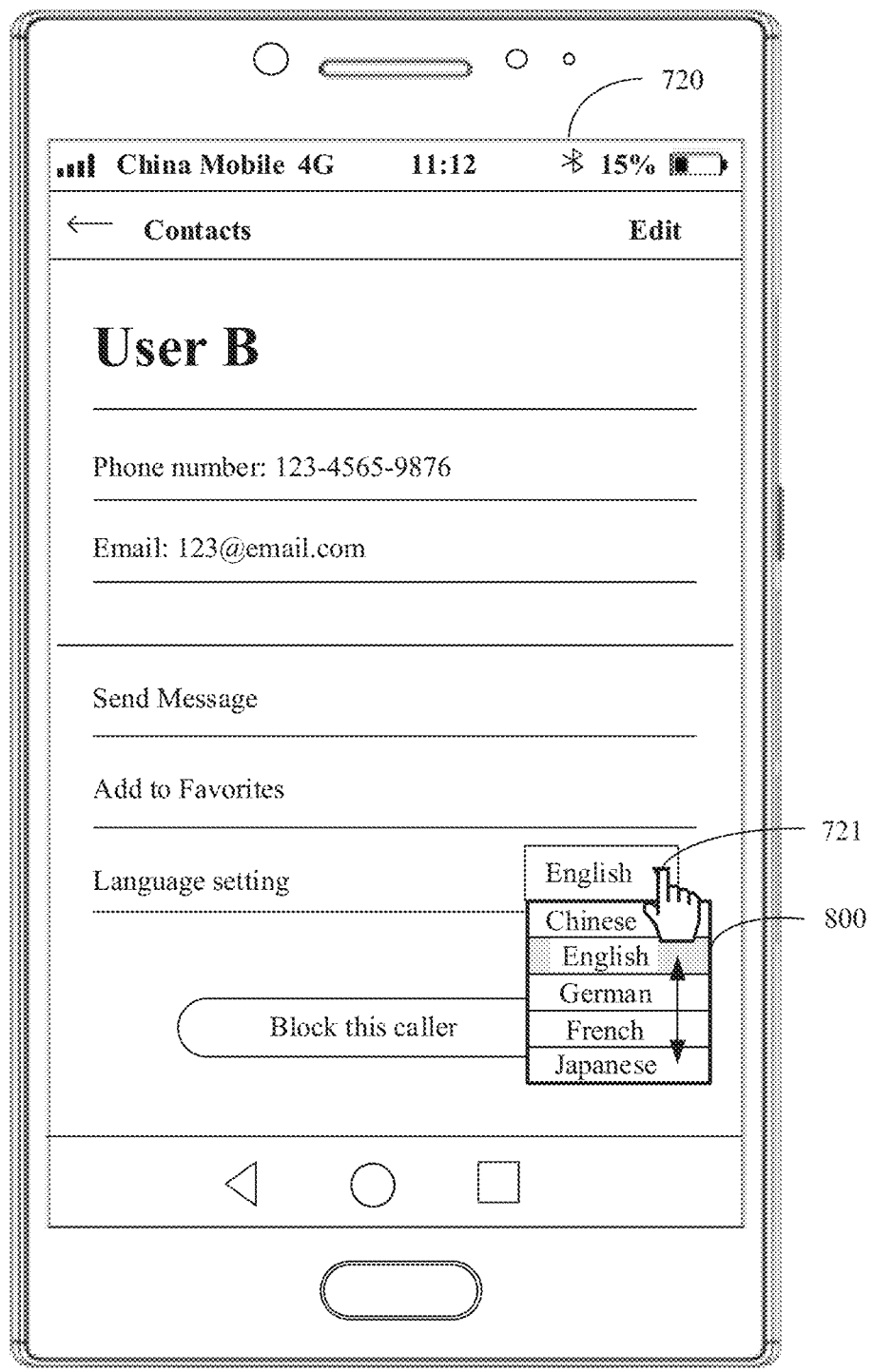
FIG. 8 is a schematic diagram of a peer-end language list according to an embodiment of this application.

In addition, in some embodiments, the user A may set a language that is set for the user B to a peer-end language. For example, as shown in FIG. 7A, the display of the electronic device 100 displays the user interface 400. The electronic device 100 displays a user interface 710 on the display in response to the operation performed on the icon of Phone. The user interface 710 includes a contact list 711 and a function bar 712. The function bar 712 includes a button for creating a new contact, and the like. The electronic device 100 may display a user interface 720 on the display in response to an operation performed on the user B in the contact list 711. The user interface 720 includes a language setting button 721. The language setting button 721 is used to set the language used by user B. In addition, the user interface 720 may further include a name of the user B, a contact method (such as a phone number or an email address), and a function button such as "Send Message". The user may operate the language setting button 721 to set the peer-end language. For example, as shown in FIG. 8, the electronic device 100 displays a language list 800 on the display in response to an operation performed on the language setting button 721. The language list includes a language supported by the electronic device 100 and/or a language supported by a translation server. The user may select a language in the language list 800 as the peer-end language. For example, if the user selects English, the peer-end language is set to English. The user may alternatively slide up or down the language list 800 to search for a language that needs to be set.

In some other embodiments, to facilitate a user operation, the user may further set the local-end language by using the local-end language setting button 432 included in the user interface 430 shown in FIG. 4a-4, and set the peer-end language by using the peer-end language setting button 433 included in the user interface 430 shown in FIG. 4a-4. In addition, in this embodiment of this application, the local-end language setting button 432 and the peer-end language setting button 433 may alternatively be included in the user interface 420.

When the electronic device 200 supports the voice call translation function, after receiving the call request of the electronic device 100, the electronic device 200 may automatically enable the voice call translation function. For details, refer to the manner in which the electronic device 100 automatically enables the voice call translation function. Details are not described herein again. In addition, the user may alternatively manually enable or disable the call translation function on a user interface displayed on the display of the electronic device 200. For example, the user interface may be the user interface 430, the user interface 440, or the user interface 450 shown in FIG. 4b-1 to FIG. 4b-3.

The foregoing embodiment of this application may also be understood as follows: An electronic device (that is, a local end) receives a first character sent by a peer end. The first character is used to indicate that a voice call translation function of the peer end is enabled. If a voice call translation function of the local end is enabled before the local end receives the first character, the voice call translation function of the local end is disabled. Optionally, after the voice call translation function of the local end is disabled, the local end sends a second character to the peer end, to notify the peer end that the voice call translation function of the local end is disabled. If the local end does not enable or does not support the voice call translation function when receiving the first character, the local end does not make a response, or sends a target character (for example, a second character, or a character other than the first character or the second character) to the peer end, to notify the peer end that the local end does not enable or does not support the voice call translation function.

Figure 9:
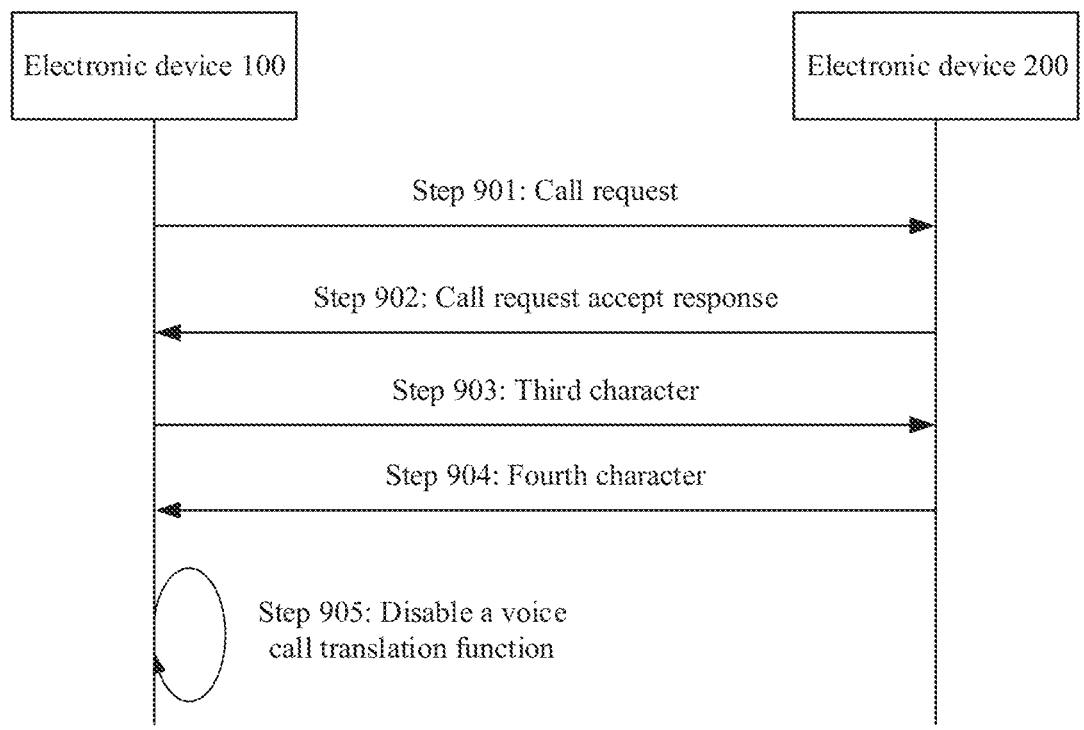
FIG. 9 is a schematic flowchart of another voice call translation capability negotiation method according to an embodiment of this application.

FIG. 9 is a schematic flowchart of another voice call translation capability negotiation method according to an embodiment of this application. The method specifically includes the following steps.

Step 901: An electronic device 100 sends a call request to an electronic device 200.

Step 902: After receiving the call request sent by the electronic device 100, the electronic device 200 sends a call request accept response to the electronic device 100.

For specific implementations of step 901 and step 902 in this embodiment of this application, refer to the specific implementations of step 301 and step 302 in the voice call translation capability negotiation method shown in FIG. 3. Details are not described herein again.

Step 903: After the electronic device 100 receives the call request accept response, if a voice call translation function is enabled, the electronic device 100 sends a third character to the electronic device 200, where the third character is used to indicate that the voice call translation function of the electronic device 100 is enabled. For example, the electronic device 100 may send the third character to the electronic device 200 in a form of a DTMF tone. For example, the third character may be 1, 0, or another positive integer, or may be # or *.

It should be noted that this embodiment of this application is described by using an example in which the electronic device 100 initiates voice call translation capability negotiation. For example, when an electronic device that initiates voice call translation capability negotiation is an electronic device that first completes establishment of a communication link, the electronic device 100 is one of the electronic device 100 and the electronic device 200 that first completes establishment of a communication link. For another example, when an electronic device that initiates voice call translation capability negotiation is a calling party, the electronic device 100 is a calling party. For another example, when an electronic device that initiates speech translation capability negotiation is a called party, after the electronic device 200 accepts, in response to a user operation, the call request sent by the electronic device 100, the electronic device 200 sends the call request accept response and the third character to the electronic device 100, and the third character is used to indicate that a voice call translation function of the electronic device 200 is enabled.

It should be further noted that, when only one of the electronic device 100 and the electronic device 200 enables the voice call translation function, and the other electronic device does not support or disables the voice call translation function, the electronic device that enables the voice call translation function initiates voice call translation capability negotiation. In the method shown in FIG. 9, for a specific electronic device that initiates voice call translation capability negotiation, refer to related descriptions of the embodiment shown in FIG. 3.

Step 904: If the voice call translation function is enabled before the electronic device 200 receives the third character, the electronic device 200 sends a fourth character to the electronic device 100, where the fourth character is used to indicate that the voice call translation function of the electronic device 100 is disabled.

In some embodiments, when the electronic device 200 does not support or disables the voice call translation function, if the electronic device 200 cannot identify the third character after receiving the third character sent by the electronic device 100, the electronic device 200 may not make a response. In this case, if the electronic device 100 does not receive, within preset duration, the response sent by the electronic device 200, the electronic device 100 determines that the electronic device 200 does not support or disables the voice call translation function, and the electronic device 100 continues to enable the voice call translation function. In this embodiment of this application, the preset duration may be correspondingly set based on an actual situation, for example, 2S, 5S, or 10S. In some other embodiments, when the electronic device 200 does not support or disables the voice call translation function, if the electronic device 200 cannot identify the third character after receiving the third character sent by the electronic device 100, the electronic device 200 may send a preset character to the electronic device 100. If the electronic device 100 determines, after receiving the preset character, that the electronic device 200 does not support or disables the voice call translation function, the electronic device 100 continues to enable the voice call translation function. It should be understood that the preset character and the third character are different characters.

Step 905: After receiving the fourth character, the electronic device 100 disables the voice call translation function.

It should be noted that, to enable the electronic device 200 to determine that voice call translation capability negotiation is completed, in some embodiments, the electronic device 100 may further send a fifth character to the electronic device 200. The fifth character may be used to indicate that the electronic device 100 disables the voice call translation function. For example, the electronic device 100 may send the fifth character to the electronic device 200 in a form of a DTMF tone. The fifth character may be a character other than the third character and the fourth character. For example, if the third character is 1 and the fourth character is 2, the fifth character may be 3 or a positive integer other than 1 and 2, or may be # or *.

It should be noted that functions of the third character, the fourth character, and the fifth character in this embodiment of this application may be agreed on in advance in a form of a communication protocol.

After receiving the fifth character sent by the electronic device 100, the electronic device 200 plays, in a language 2, a prompt tone indicating that the voice call translation function is enabled, and sends, to the electronic device 100, a prompt tone that is in a language 1 and that indicates that the voice call translation function is enabled. For example, when the language 2 is Chinese, a text of the prompt tone indicating that the translation function is enabled may be "Huan ying shi yong yu yin tong hua fan yi gong neng, zai yu yin bo bao wan bi hou kai shi tong hua.".

The foregoing embodiment of this application may also be understood as follows: An electronic device (that is, a local end) receives a third character sent by a peer end. The third character is used to indicate that a voice call translation function of the peer end is enabled. If a voice call translation function of the local end is enabled before the local end receives the third character, the local end sends a fourth character to the peer end. The fourth character is used to indicate that the voice call translation function of the local end is enabled and request the peer end to disable the voice call translation function. After receiving the fourth character, the peer end disables the voice call translation function. Optionally, after disabling the voice call translation function, the peer end sends a fifth character to the local end. The fifth character is used to indicate that the voice call translation function of the peer end is disabled. If the local end does not enable or does not support the voice call translation function when receiving the third character, the local end does not make a response, or sends a target character (for example, a character other than the third character, the fourth character, and the fifth character) to the peer end, to notify the peer end that the local end does not enable or does not support the voice call translation function.

It should be noted that, in this embodiment of this application, when the voice call translation function of the electronic device 100 or the electronic device 200 is enabled, a text of a speech of a call between two parties and a text of a corresponding translation result of the speech may be further displayed to a user on a display. It should be understood that the text of the speech of the call between the two parties may also be referred to as a text of a speech of a call record between the two parties, and the text of the translation result of the speech may also be referred to as a text of a translation result of the speech of the call record between the two parties. For example, as shown in FIG. 4a-4, the user interface 430 may further include a text display area 434, and the electronic device 100 may display a text of a speech of a call between the user A and the user B and a text of a translation result of the speech in the text display area 434. For example, the user interface 450 shown in FIG. 4b-3 may further include a text display area 454, and the electronic device 100 may display a text of a speech of a call between the user A and the user B and a text of a translation result of the speech in the text display area 454. In a call between the electronic device 100 and the electronic device 200, when the electronic device 100 and the electronic device 200 both support the voice call translation functions, one electronic device enables the voice call translation function, and the other electronic device disables the voice call translation function. For example, the speech translation function of the electronic device 100 is enabled, and the speech translation function of the electronic device 200 is disabled. The electronic device 100 may display a text of a speech of the call between the user A and the user B and a text of a translation result of the speech on the display. In some embodiments, the speech translation function of the electronic device 100 is enabled, and a text display function of the electronic device 100 may be disabled. In other words, when the electronic device 100 performs a translation function or the electronic device 100 performs a translation function together with a translation server, the electronic device 100 may not display a text of a speech and a text of a translation result of the speech, and the electronic device 200 may display the text of the speech of the call between the user A and the user B and the text of the translation result of the speech on the display. For example, when the electronic device 200 supports the voice call translation function, if the voice call translation function is enabled, the electronic device 200 has a text display function in a voice call, and may display the text of the speech of the call between the user A and the user B and the text of the translation result of the speech on the display. However, after the voice call translation function is disabled, if the electronic device 200 also disables the text display function in the voice call, the electronic device 200 cannot display the text of the speech of the call between the user A and the user B and the text of the translation result of the speech. For another example, the text display function and the voice call translation function of the electronic device 200 in the voice call are two independent functions. After the voice call translation function of the electronic device 200 is disabled, the electronic device 200 only cannot obtain a translation result of a speech through translation by the electronic device 200 or cannot obtain a translation result of a speech from a translation server. However, display of the text of the speech of the call between the user A and the user B and the text of the translation result of the speech by the electronic device 200 is not affected. Therefore, when the electronic device 200 enables the text display function and disables the voice call translation function in the voice call, the electronic device 200 can still display the text of the speech of the call between the user A and the user B and the text of the translation result of the speech on the display. It should be noted that the text of the speech of the call between the user A and the user B and the text of the translation result of the speech may alternatively be sent by the electronic device 100 to the electronic device 200. Alternatively, the electronic device 200 may perform speech recognition to convert the speech and the translation result of the speech into texts for display on the display. In addition, for the electronic device 200, a text of a speech of the user A, a text of a translation result of the speech of the user A, and a text of a translation result of a speech of the user B may be sent by the electronic device 100 to the electronic device 200, and the speech of the user B is converted into a text by the electronic device

200. A manner of obtaining a text of a speech by the electronic device 200 is not limited in this embodiment of this application.

In some embodiments, when the text display function is enabled, the electronic device 100 in this embodiment of this application may alternatively display only the text of the translation result of the speech of the user B, or the electronic device 100 displays only the text of the speech of the user B and the text of the translation result of the speech of the user B; and the electronic device 200 may alternatively display only the text of the translation result of the speech of the user A, or the electronic device 100 displays only the text of the speech of the user A and the text of the translation result of the speech of the user A.

It should be noted that, when the voice call translation function is disabled, and the text display function is restricted in the voice call, in an example of the user interface 450 shown in FIG. 4b-3, if a speech translation button of the electronic device 200 is off (OFF), the text display area 454 may not display the text of the speech of the call between the user A and the user B and the text of the translation result of the speech. In some other embodiments, when the speech translation button is off, only a function of obtaining voice call translation by the electronic device 200 is disabled, and display of the text of the speech of the call between the user A and the user B and the text of the translation result of the speech is not affected. In this case, to help the user determine whether to display a text in the text display area, a text display mode button may be added to the user interface. If the text display mode button is on, the electronic device 200 displays the text of the speech of the call between the user A and the user B and the text of the translation result of the speech in the text display area. If the text display mode button is off, the electronic device 200 does not display the text of the speech of the call between the user A and the user B and the text of the translation result of the speech in the text display area.

In addition, in this embodiment of this application, after receiving the fourth character, the electronic device 100 disables the voice call translation function.

To help the user know a status in which the electronic device 100 automatically disables the voice call translation function, in some embodiments, after receiving the fourth character, the electronic device 100 further notifies the user A that the voice call translation function of the electronic device 200 is enabled. For a manner in which the electronic device 100 prompts the user A that the voice call translation of the electronic device 200 is enabled, refer to the manner in which the electronic device 200 prompts the user that the voice call translation function of the electronic device 100 is enabled.

In addition, to improve reliability of voice call translation in a voice call between the user A and the user B, after automatically disabling the voice call translation function, the electronic device 100 may further prohibit the user from enabling the voice call translation function. For a related implementation, refer to the implementation in which the electronic device 200 prohibits the user from enabling the voice call translation function in the method shown in FIG. 3. In some embodiments, to improve interaction between the user and the electronic device 100, after prohibiting the user from enabling the voice call translation function, the electronic device 100 further prompts the user that the voice call translation function is prohibited from being enabled. In some other embodiments, after prohibiting the user from enabling the voice call translation function, in addition to prompting the user that the voice call translation function is prohibited from being enabled, the electronic device 100 further prompts the user with an occasion of cancelling the restriction on enabling the voice call translation function. For a related implementation, refer to the manner in which the electronic device 200 provides a prompt after prohibiting the user from enabling the voice call translation function in the method shown in FIG. 3.

For example, when the electronic device 100 enables the voice call translation function in the call between the user A and the user B, the user A may further disable the voice call translation function by operating a speech translation button included in a user interface displayed by the electronic device 100. When the electronic device 100 disables the voice call translation function in response to the user operation, the electronic device 100 may further send a preset character to the electronic device 200, to notify the electronic device 200 that the electronic device 100 disables the voice call translation function. If the electronic device 200 receives the preset character when the voice call translation function of the electronic device 200 is disabled, the electronic device 200 may automatically enable the voice call translation function.

Figure 10:
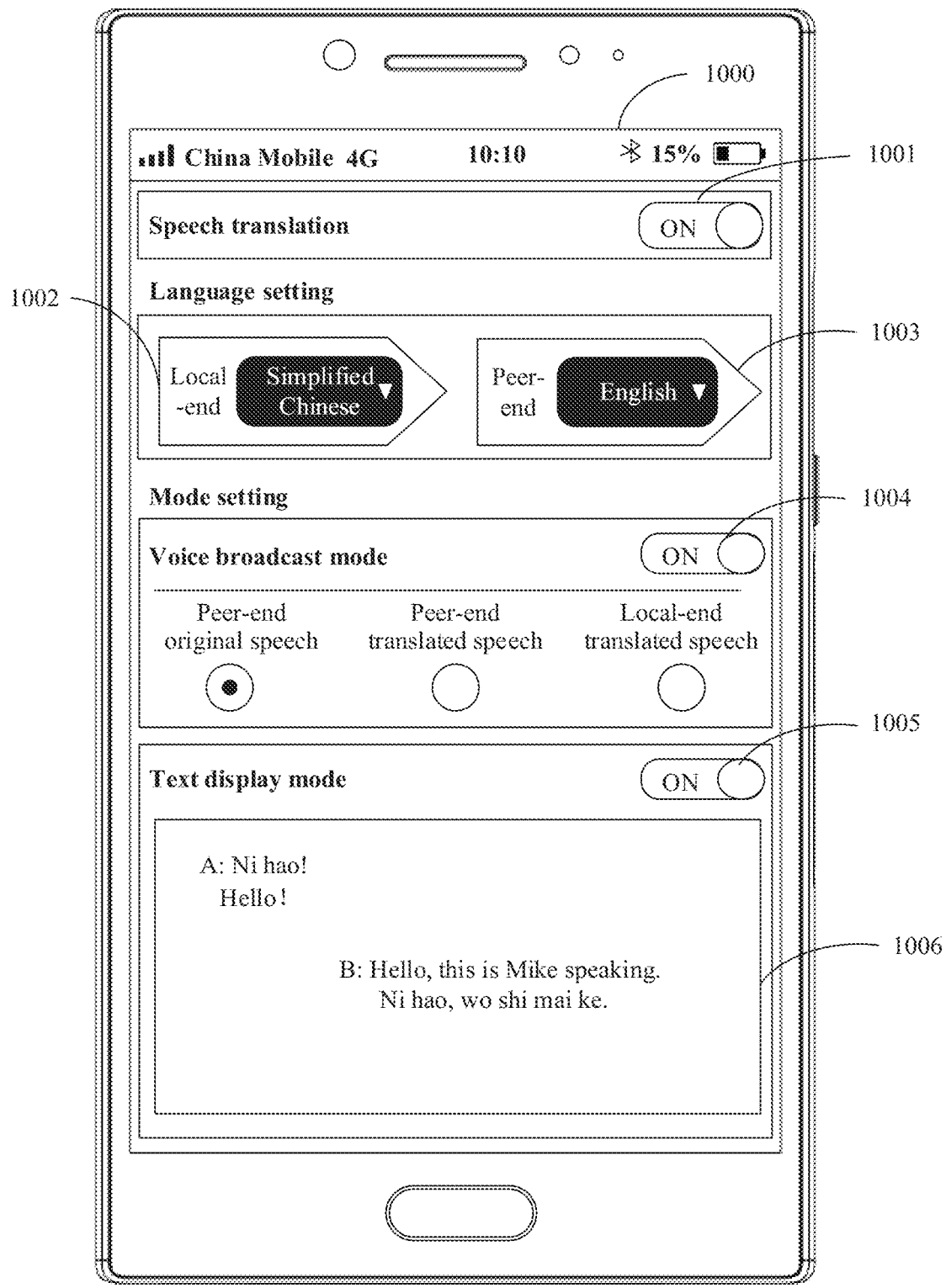
FIG. 10 is a schematic diagram of a user interface according to an embodiment of this application.

To facilitate user operation and setting, in some embodiments, the electronic device 100 may display a user interface 1000 shown in FIG. 10 on the display in response to an operation performed on a speech translation button 421. In addition, in some other embodiments, the electronic device 200 may display a user interface 1000 on the display in response to an operation performed on a speech translation button 511. As shown in FIG. 10, the user interface 1000 includes a speech translation button 1001, a local-end language setting button 1002, a peer-end language setting button 1003, a voice broadcast mode button 1004, and a text display mode button 1005. When the voice broadcast mode button 1004 is off (OFF), the electronic device disables voice broadcast. When the voice broadcast mode button 1004 is on (ON), the electronic device enables voice broadcast. The electronic device 100 is used as an example. As shown in FIG. 10, if a peer-end original speech and a peer-end translated speech are selected, and a local-end translated speech is not selected, the electronic device 100 broadcasts the speech of the user B and the translation result of the speech of the user B, but does not broadcast the translation result of the speech of the user A. However, when the local-end translated speech is selected, the electronic device 100 broadcasts the translation result of the speech of the user A. Similar to the broadcast mode button 1004, when the text display mode button 1005 is off (OFF), the electronic device 100 does not display the text corresponding to the speech or the text corresponding to the translation result; or when the text display mode button 1005 is on (ON), the electronic device 100 displays the text corresponding to the speech or the text corresponding to the translation result. In some embodiments, when the text display mode button 1005 is off (OFF), the electronic device may further hide a text display area 1006; or when the text display mode button 1005 is on (ON), the electronic device may further display the text display area 1006. To help the user view the text of the call record, the electronic device may display the text display area 1006 in full screen in response to an operation performed on the text display area 1006. For example, the operation performed on the text display area 1006 may be sliding up with two fingers or double tapping. It should be noted that the text display area 1006 is used to display a text of a call record of the user and a text of a corresponding translation result. For example, the user A uses Chinese, the user B uses English, a text of a speech of the user A that is collected by the electronic device 100 is "Ni hao!", a text of a translation result is "Hello!", a speech of the user B that is obtained by the electronic device 100 is "Hello, this is Mike speaking.", and a text of a translation result is "Ni hao, wo shi mai ke." In this case, text information of a call record and text information of a corresponding translation result that are displayed in the text display area 1006 may be shown in FIG. 10.

It should be noted that, in this embodiment of this application, when the speech translation button 1001 is off, the electronic device 100 may automatically turn off the voice broadcast mode button 1004, and/or automatically turn off the text display mode button 1005. In this case, when the electronic device 100 establishes a communication link with another electronic device for a call, a prior-art call method of an electronic device may be used. It should be further noted that, in this embodiment of this application, turn-off of the speech translation button 1001 does not affect turn-off and turn-on of the voice broadcast mode button 1004, and does not affect turn-off and turn-on of the text display mode button 1005. In this case, if the speech translation button 1001 is off, the electronic device 100 cannot obtain a translation result of a speech. Whether the electronic device 100 broadcasts a translation result or a speech of the user may be related to a setting of a voice broadcast mode. For example, if the voice broadcast mode is on, and only a peer-end original speech option is selected, the electronic device 100 broadcasts only the peer-end original speech. For another example, if the voice broadcast mode is off, the electronic device 100 does not broadcast any speech. Similarly, whether the electronic device 100 displays a text of a speech is related to whether the text display mode button 1005 is on. When the text display mode button 1005 is on, the electronic device 100 displays a text of a speech and a text of a translation result of the speech; or when the text display mode button 1005 is off, the electronic device 100 does not display a text of a speech and a text of a translation result of the speech.

In this embodiment of this application, the user may set the voice broadcast mode by operating a virtual button on the user interface 1000. In addition, in this embodiment of this application, the electronic device may alternatively automatically set the broadcast mode.

In addition, if the electronic device 100 and the electronic device 200 can both implement dual-end speech translation, when the voice call translation functions of the electronic device 100 and the electronic device 200 are both enabled, to avoid repeated translation, in some other embodiments, the electronic device 100 and the electronic device 200 may perform voice call translation capability negotiation, so that the electronic device 100 and the electronic device 200 each translate only a collected local-end speech, but do not translate a peer-end speech. For the electronic device 100, a local-end speech is a speech of the user A that is collected by the electronic device 100 through a sound collection sensor (for example, a microphone) of the electronic device 100, and a peer-end speech is a speech of the user B that is sent by the electronic device 200 and that is received through a mobile communications network. For the electronic device 200, a local-end speech is a speech of the user B that is collected by the electronic device 200 through a sound collection sensor (for example, a microphone) of the electronic device 200, and a peer-end speech is a speech of the user A that is sent by the electronic device 100 and that is received through a mobile communications network.

For a manner in which the electronic device 100 and the electronic device 200 enable the voice call translation functions and a manner in which the electronic device 100 and the electronic device 200 trigger voice call translation capability negotiation, refer to the foregoing related descriptions. Details are not described herein again.

Figure 11:
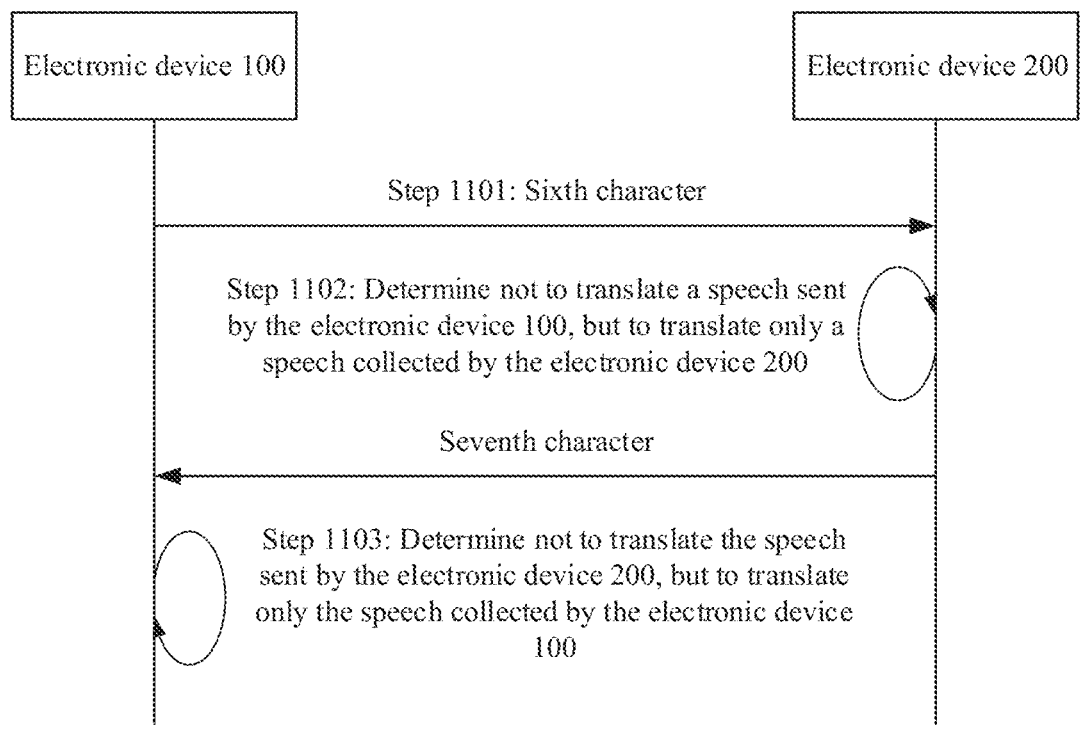
FIG. 11 is a schematic flowchart of another voice call translation capability negotiation method according to an embodiment of this application.

An example in which the electronic device 100 initiates voice call translation capability negotiation is used below. FIG. 11 shows another voice call translation capability negotiation method according to this application. The method specifically includes the following steps.

Step 1101: After the electronic device 100 establishes a communication link with the electronic device 200, if a voice call translation function of the electronic device 100 is enabled, the electronic device 100 sends a sixth character to the electronic device 200, where the sixth character is used to indicate that the voice call translation function of the electronic device 100 is enabled.

It should be noted that, for a sending manner and a specific implementation of the sixth character, refer to the sending manner and the specific implementation of the first character in the method shown in FIG. 3 in the embodiments of this application.

In this embodiment of this application, when the electronic device 100 disables or does not support the voice call translation function, after the electronic device 100 establishes the communication link with the electronic device 200, the electronic device 100 does not initiate voice call translation capability negotiation.

Step 1102: If a voice call translation function is enabled, after receiving the sixth character, the electronic device 200 determines not to translate a speech sent by the electronic device 100, but to translate only a speech collected by the electronic device 200, and sends a seventh character to the electronic device 100, where the seventh character is used to indicate that the voice call translation function of the electronic device 200 is enabled. It should be noted that the sixth character and the seventh character are different characters.

Figure 12:
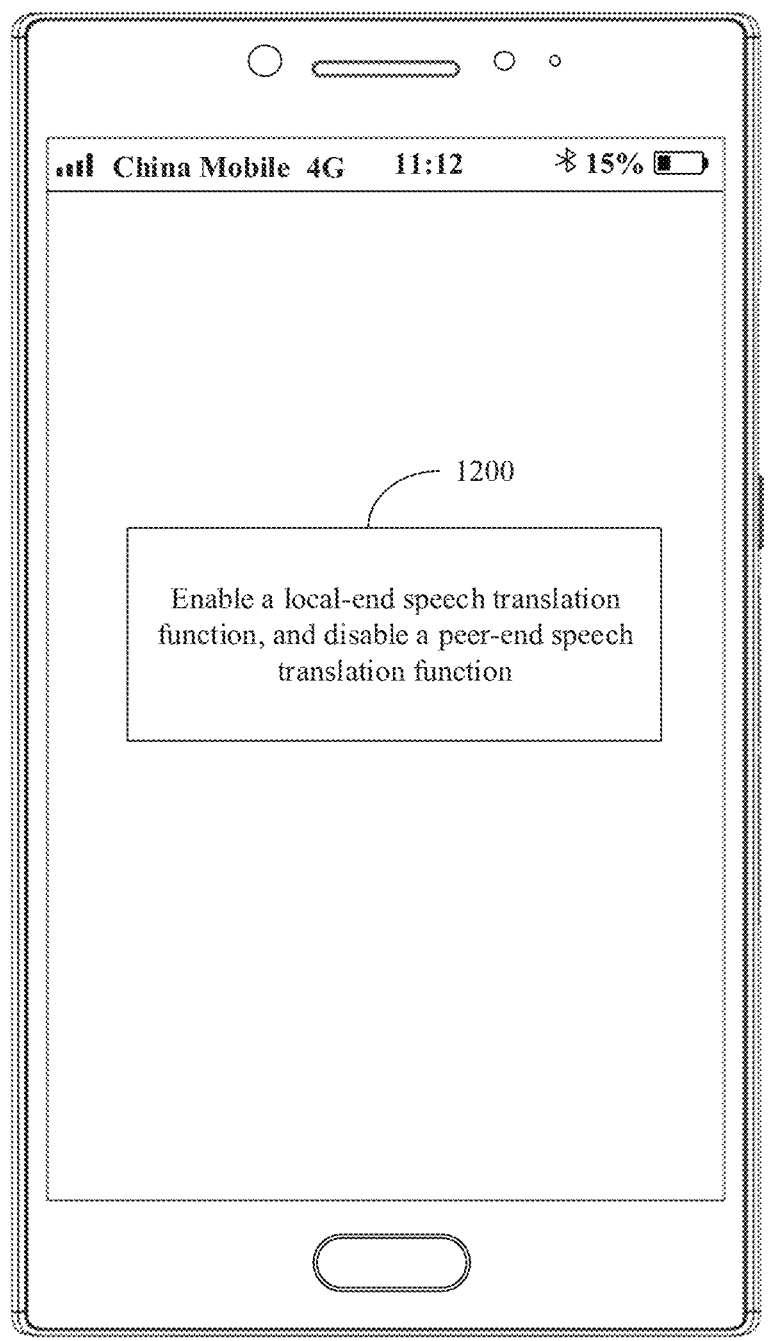
FIG. 12 is a schematic diagram of another user interface according to an embodiment of this application.

To prompt a user, in some embodiments, after the electronic device 200 determines not to translate the speech sent by the electronic device 100, but to translate only the speech collected by the electronic device 200, a prompt box 1200 shown in FIG. 12 is displayed on a display. The prompt box 1200 includes prompt information indicating that translation of a peer-end speech is restricted. For example, as shown in FIG. 12, the prompt box 1200 includes "Enable a local-end speech translation function and disable a peer-end speech translation function". In some other embodiments, the electronic device 200 may further prompt, in a voice form, the user that translation of the peer-end speech is restricted.

If the voice call translation function is not enabled, the electronic device 200 may not respond to the sixth character, and does not send a message to the electronic device 100, or sends a preset character to indicate that the electronic device 200 does not enable the speech translation function. In this case, the electronic device 100 performs dual-end translation.

Step 1103: After receiving the seventh character, if the voice call translation function is enabled, the electronic device 100 determines not to translate the speech sent by the electronic device 200, but to translate only the speech collected by the electronic device 100.

After determining not to translate the speech sent by the electronic device 200, but to translate only the speech collected by the electronic device 100, the electronic device 100 may further prompt the user that translation of the peer-end speech is restricted. For a specific prompt manner, refer to the manner in which the electronic device 200 prompts the user that translation of the peer-end speech is restricted.

Therefore, according to the foregoing technical solution, the electronic device 100 and the electronic device 200 can implement voice call translation capability negotiation. This helps reduce a possibility of repeated translation, and further helps reduce a probability of an error.

In addition, after voice call translation capability negotiation is completed, in some embodiments, the electronic device 100 may play, in a language 1, a prompt tone indicating that the speech translation function is enabled, and the electronic device 200 may play a prompt tone that is in a language 2 and that indicates that the speech translation function is enabled. For example, when the language 1 is Chinese, a text of the prompt tone indicating that the speech translation function is enabled may be "Huan ying shi yong yu yin tong hua fan yi gong neng, zai yu yin bo bao wan bi hou kai shi tong hua.".

It is assumed that the electronic device 100 and the electronic device 200 each translate only a local-end speech. For example, a user A uses the electronic device 100, and a user B uses the electronic device 200. The electronic device 100 may send a collected speech of the user A and an obtained translation result of the speech of the user A to the electronic device 200. After receiving the speech of the user A and the obtained translation result of the speech of the user A, the electronic device 200 may play the speech of the user A and the translation result of the speech of the user A through a speaker or an earpiece. Similarly, the electronic device 200 may send a collected speech of the user B and an obtained translation result of the user B to the electronic device 100. After receiving the speech of the user B and the translation result of the user B, the electronic device 100 may play the speech of the user B and the translation result of the speech of the user B through a speaker or an earpiece.

However, when an electronic device plays a speech of a user and a translation result of the speech of the user, the translation result may be collected by a sound sensor (for example, a microphone) of the electronic device, and consequently repeated translation is caused. For example, when the electronic device 100 plays the translation result of the speech of the user B, the translation result of the speech of the user B may be collected by a microphone of the electronic device 100 and then is sent to the electronic device 200 after being translated. In some embodiments, if the voice call translation function is enabled, after receiving the sixth character, the electronic device 200 may further disable broadcast of a translation result of a speech or broadcast of a speech, but displays a text of a speech of a call record between two parties and a text of a translation result of the speech of the call record on the display. After receiving a character 2, the electronic device 100 may further disable broadcast of a translation result of a speech or broadcast of a speech, but displays a text of a speech of a call record between two parties and a text of a translation result of the speech of the call record on the display. It should be noted that, in this embodiment of this application, for a specific manner of displaying a text of a speech of a call record between two parties and a text of a translation result of the speech of the call record, refer to the foregoing related implementation.

The user interface 1000 shown in FIG. 10 is used as an example. An implementation in which the electronic device 200 disables broadcast of a translation result of a speech may be as follows: The electronic device 200 automatically selects a peer-end original speech instead of options of a peer-end translated speech and a local-end translated speech. An implementation in which the electronic device 200 disables broadcast of a speech may be as follows: The electronic device 200 automatically sets the voice broadcast mode button 1004 to be off (OFF). An implementation in which the electronic device 200 displays a call record between two parties and a translation result of the call record on the display may be as follows: The electronic device 200 automatically sets the text display mode button 1005 to be on (ON).

It should be noted that, in this embodiment of this application, if the user A uses the electronic device 100 and the user B uses the electronic device 200, when the electronic device 200 does not broadcast a translation result of a speech, the electronic device 100 may send or not send the translation result of the speech of the user A to the electronic device 200. When the electronic device 200 displays the text of the speech of the call record between the two parties and the text of the translation result of the speech of the call record, the electronic device 100 may send a text of the speech of the user A and a text of the translation result of the speech of the user A to the electronic device 200, or the electronic device 200 may obtain a corresponding text based on the speech of the user A and the translation result of the speech of the user A that are sent by the electronic device 100. An implementation of the electronic device 100 is similar to that of the electronic device 200. Details are not described herein again.

In some other embodiments, when an electronic device can translate only a local-end speech, the electronic device may translate the local-end speech through a preconfigured translation engine, or may translate the local-end speech through a translation server. In this case, when a speech translation function of the electronic device (the local end) is enabled, the electronic device may be configured to: obtain a translation result of the local-end speech, and send the translation result of the local-end speech to a peer end.

Figure 13A:
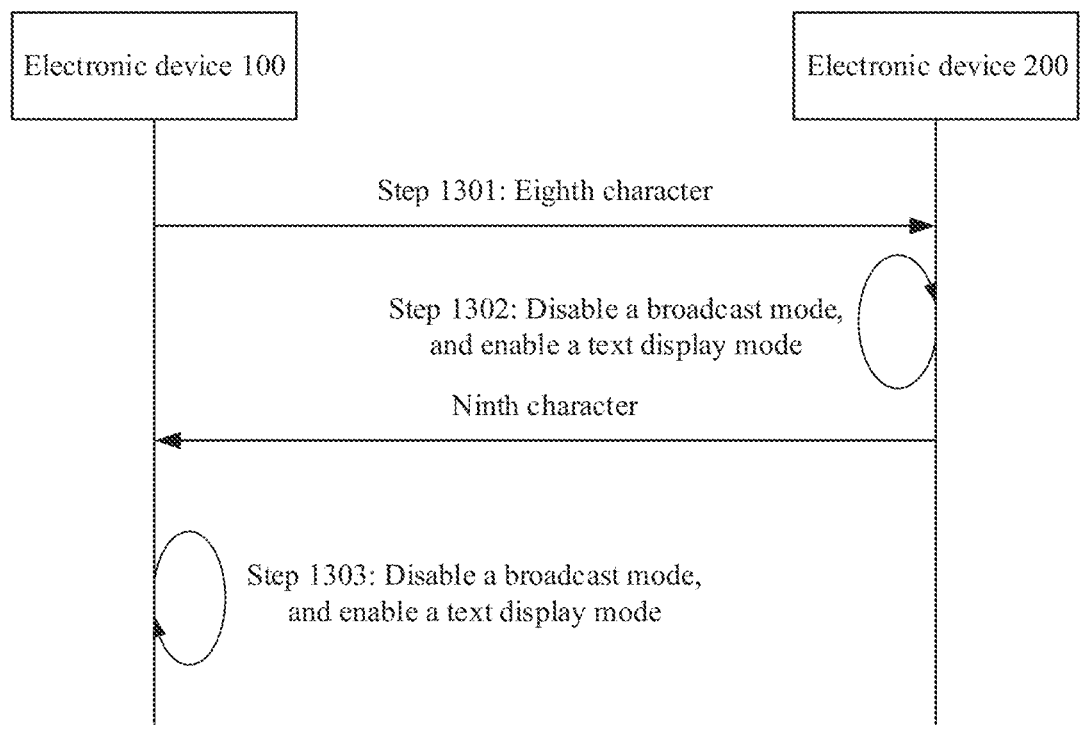
FIG. 13A is a schematic flowchart of another voice call translation capability negotiation method according to an embodiment of this application.

The communications system shown in FIG. 2 is used as an example. For example, the electronic device 100 and the electronic device 200 can both implement only local-end speech translation. The user A uses the electronic device 100, and the user B uses the electronic device 200. To reduce a possibility of repeated speech translation by the user A and the user B during communication, as shown in FIG. 13A, an embodiment of this application provides another voice call translation capability negotiation method. The method specifically includes the following steps.

Step 1301: After the electronic device 100 establishes a communication link with the electronic device 200, if a speech translation function of the electronic device 100 is enabled, the electronic device 100 sends an eighth character to the electronic device 200, where the eighth character is used to indicate that the speech translation function of the electronic device 100 is enabled.

It should be noted that, when the electronic device 100 and the electronic device 200 can both implement speech translation, an electronic device that first completes establishment of the communication link may initiate voice call translation capability negotiation, or a calling party may initiate voice call translation capability negotiation, or a called party may initiate voice call translation capability negotiation, or the like. When one of the electronic device 100 and the electronic device 200 supports a speech translation function, after the communication link is established, the electronic device that supports the speech translation function may initiate voice call translation capability negotiation. In the method shown in FIG. 13A, for a specific electronic device that initiates voice call translation capability negotiation, refer to related descriptions of the embodiment shown in FIG. 3.

For a manner of enabling a speech translation function in this embodiment of this application, refer to the manner of enabling a speech translation function in the method shown in FIG. 3.

Step 1302: If the electronic device 200 receives the eighth character when a speech translation function is enabled, the electronic device 200 disables a voice broadcast mode, enables a text display mode, and sends a ninth character to the electronic device 100, where the ninth character is used to indicate the electronic device 100 to disable a broadcast mode and enable a text display mode.

In this embodiment of this application, disabling a voice broadcast mode may be disabling broadcast of a translation result of a speech, or may be disabling broadcast of a speech and a translation result of the speech. The electronic device 200 is used as an example. When the electronic device 200 disables broadcast of a translation result of a speech, the electronic device 200 does not play a translation result of a speech of the user A to the user B or a translation result of a speech of the user B, but plays the speech of the user A. When the electronic device 200 disables broadcast of a speech and a translation result of the speech, the electronic device 200 does not play the speech of the user A and the translation result of the speech of the user A to the user B or the translation result of the speech of the user B. That the electronic device 200 enables the text display mode means that the electronic device 200 may display a text of a speech of a call record between the user A and the user B and a text of a corresponding translation result of the speech to the user on the display. For example, as shown in FIG. 10, the electronic device 200 may display the text of the speech of the call record between the user A and the user B and the text of the corresponding translation result of the speech in the text display area 1005 included in the user interface 1000.

For sending manners and implementations of the eighth character and the ninth character, refer to the sending manner and the implementation of the first character in the method shown in FIG. 3 in the embodiments of this application.

Step 1303: After receiving the ninth character, the electronic device 100 disables the voice broadcast mode and enables the text display mode. For a specific implementation in which the electronic device 100 disables the voice broadcast mode and enables the text display mode, refer to the implementation in which the electronic device 200 disables the voice broadcast mode and enables the text display mode in step 1302.

Figure 14A:
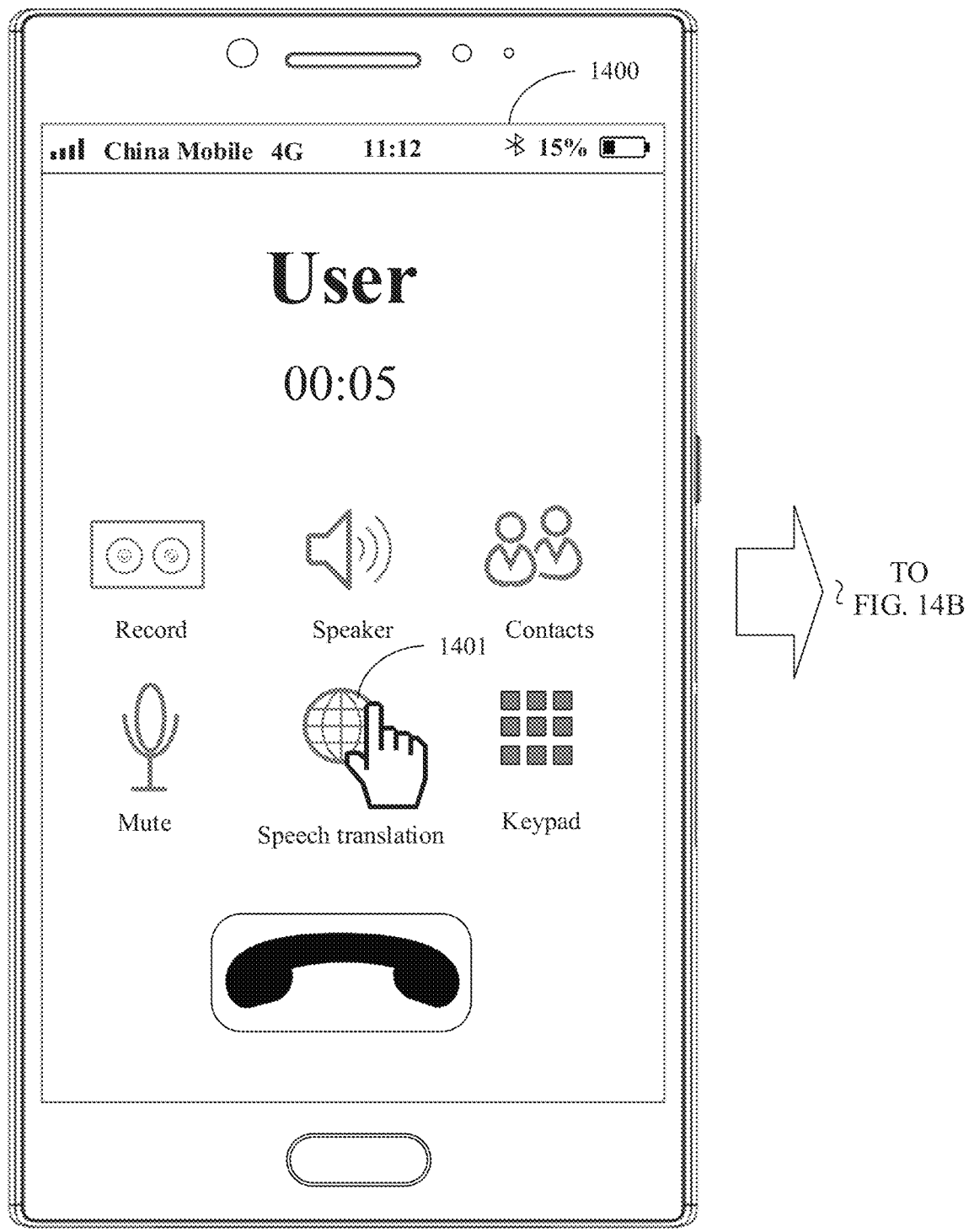
FIG. 14A and FIG. 14B are a schematic diagram of another user interface according to an embodiment of this application.
Figure 14B:
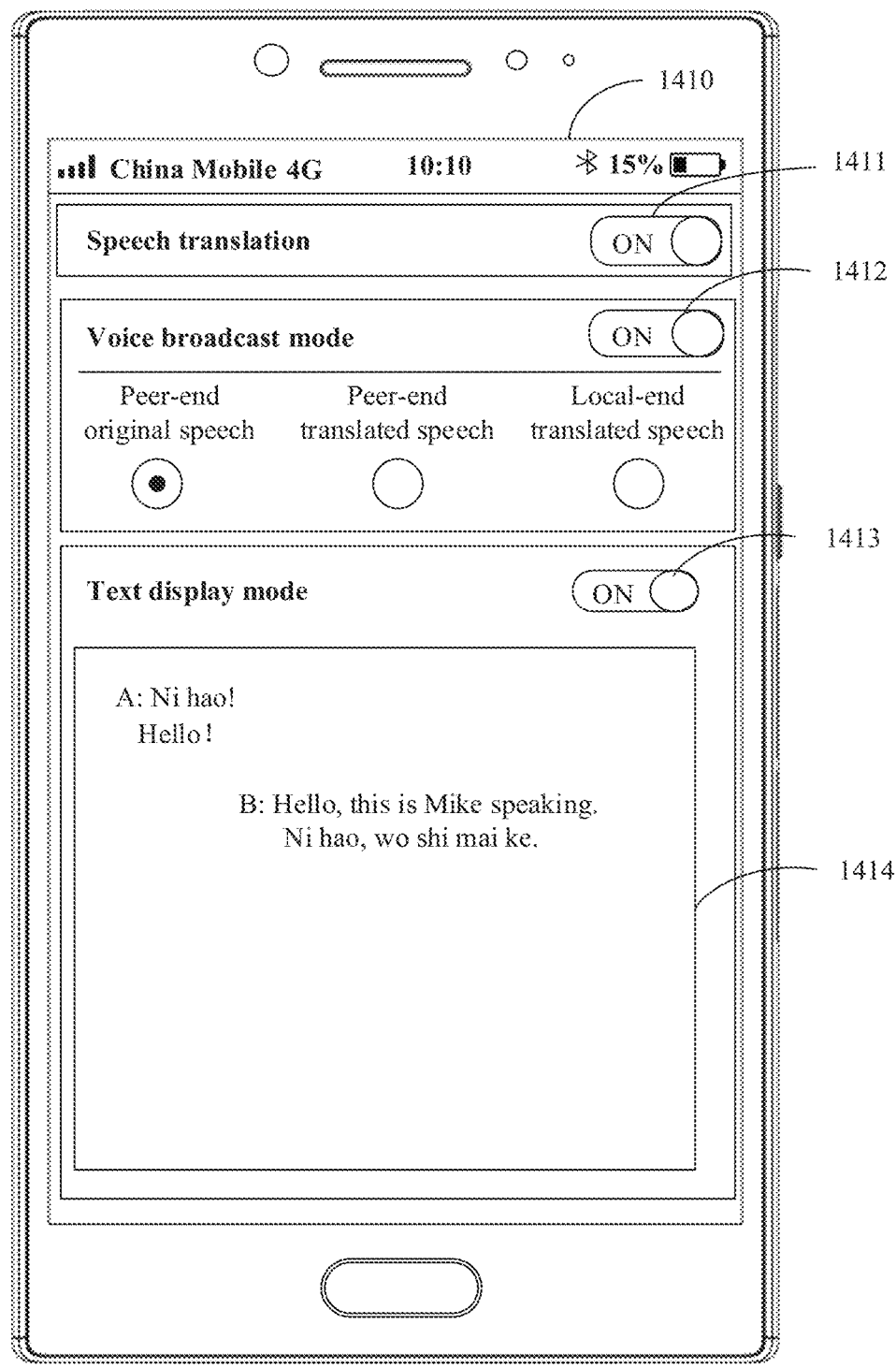

The electronic device 100 is used as an example. That the electronic device 100 disables the voice broadcast mode may be that the electronic device 100 automatically turns off a voice broadcast mode button 1412 on a user interface 1410 shown in FIG. 14B, or may be that the electronic device 100 turns on the voice broadcast mode button 1412, but selects only a peer-end original speech option. That the electronic device 100 enables the text display mode may be that the electronic device 100 automatically turns on a text display mode button 1413 on the user interface 1410 shown in FIG. 14B. It should be further noted that the user may further set a voice broadcast mode and a text display mode in a call. For example, the electronic device 100 displays a user interface 1400 during user communication. The user interface 1400 includes a speech translation button 1401. The electronic device 100 may display the user interface 1410 on the display in response to an operation performed on the speech translation button 1401. The user interface 1410 may include a speech translation button 1411, the voice broadcast mode button 1412, the peer-end original speech option, a peer-end translated speech option, a local-end translated speech option, the text display mode button 1413, and a text display area 1414. The user may correspondingly set a virtual button included in the user interface 1410 according to a requirement of the user.

In this manner, when enabling the speech translation function, the electronic device 100 notifies a peer end, that is, the electronic device 200. When enabling the speech translation function, the electronic device 200 disables the voice broadcast mode and enables the text display mode, and indicates the electronic device 100 to disable the voice broadcast mode and enable the text display mode.

Figure 13B:
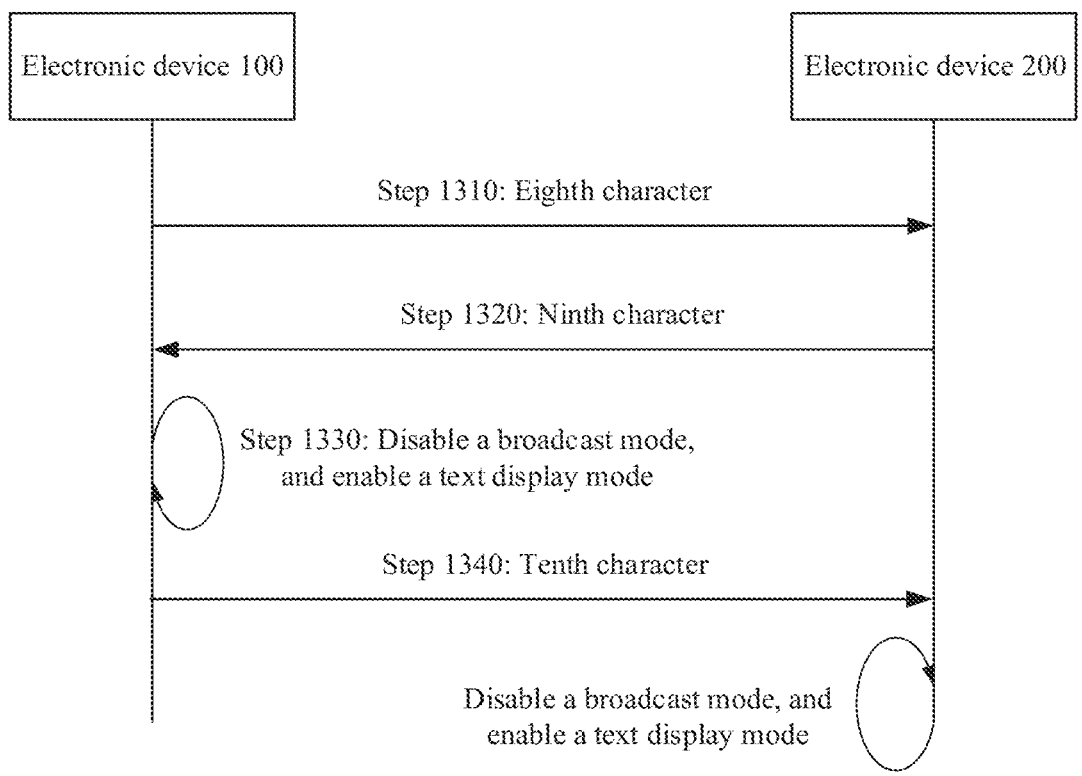
FIG. 13B is a schematic flowchart of another voice call translation capability negotiation method according to an embodiment of this application.

In some embodiments, the electronic device 100 and the electronic device 200 both support the local-end speech translation functions. To avoid repeated translation, another negotiation method is provided. As shown in FIG. 13B, the method specifically includes the following steps:

Step 1310: After the electronic device 100 establishes a communication link with the electronic device 200, if a speech translation function of the electronic device 100 is enabled, the electronic device 100 sends an eighth character to the electronic device 200, where the eighth character is used to indicate that the speech translation function of the electronic device 100 is enabled.

Step 1320: When a speech translation function of the electronic device 200 is enabled, the electronic device 200 receives the eighth character, and sends a ninth character to the electronic device 100, where the ninth character is used to indicate that the speech function of the electronic device 200 is enabled.

Step 1330: After receiving the ninth character, the electronic device 100 disables a voice broadcast mode, enables a text display mode, and sends a tenth character to the electronic device 200, where the tenth character is used to indicate the electronic device 200 to disable a voice broadcast mode and enable a text display mode. For a specific implementation in which the electronic device 100 disables the voice broadcast mode and enables the text display mode, refer to the implementation in which the electronic device 200 disables the voice broadcast mode and enables the text display mode in step 1302.

Step 1340: After receiving the tenth character, the electronic device 200 disables the broadcast mode and enables the text display mode.

In this manner, when the electronic device 100 enables the speech translation function, after the electronic device 100 determines that a peer end, that is, the electronic device 200, enables the speech translation function, the electronic device 100 disables the voice broadcast mode and enables the text display mode, and indicates the electronic device 200 to disable the voice broadcast mode and enable the text display mode.

It should be further noted that the first character to the ninth character in the embodiments of this application may be characters 0 to 1 or characters # and * in a dial keypad, or may be other predefined characters. In addition, in the embodiments of this application, information indicated by a character such as the first character in the embodiments of this application may alternatively be indicated by other information. A specific implementation form of indication information is not limited in the embodiments of this application. In the embodiments of this application, electronic devices may further implement automatic negotiation about another function by sending a character. To facilitate subsequent application extension, a plurality of reserved characters may be preconfigured. Table 1 is used as an example.

TABLE 1

| Character | Function description | Character | Function description | Character | Function description |
|---|---|---|---|---|---|
| 1 | Enable a speech translation function | 2 | Disable a speech translation function | 3 | Enable a broadcast mode |
| 4 | Disable a broadcast mode | 5 | Negotiation complete | 6 | A |
| 7 | B | 8 | C | 9 | D |
| 0 | E | # | F | * | G |

For example, as shown in Table 1, the character 6 to the character * are reserved characters, and may be used to implement automatic negotiation about another function.

The foregoing embodiments in the embodiments of this application may be separately implemented, or may be randomly combined with each other.

In the embodiments provided in this application, the methods provided in the embodiments of this application are described from a perspective in which an electronic device is used as an execution body. To implement functions in the methods provided in the embodiments of this application, the electronic device may include a hardware structure and/or a software module, and implement the functions in a form of the hardware structure, the software module, or a combination of the hardware structure and the software module. Whether a specific function of the foregoing functions is performed by the hardware structure, the software module, or the combination of the hardware structure and the software module depends on a specific application and a design constraint of the technical solution.

Figure 15:
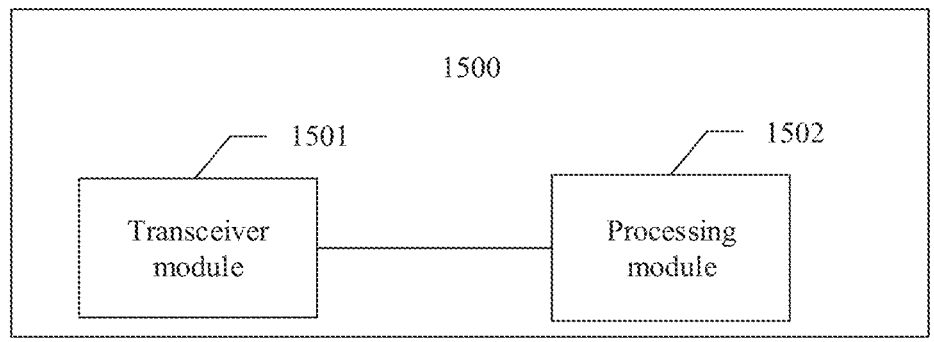
FIG. 15 is a schematic structural diagram of another electronic device according to an embodiment of this application.

Based on a same concept, FIG. 15 shows an electronic device 1500 according to this application. For example, the electronic device 1500 includes a transceiver module 1501 and a processing module 1502. When the electronic device 1500 performs the steps performed by the electronic device 200 in the voice call translation capability negotiation method shown in FIG. 3, the transceiver module 1501 may be configured to perform step 301 to step 303, and the processing module 1502 may be configured to perform step 304. When the electronic device 1500 performs the steps performed by the electronic device 200 in the voice call translation capability negotiation method shown in FIG. 9, the transceiver module 1501 may be configured to perform step 901 to step 904, and the processing module 1502 may be configured to perform step 905. When the electronic device 1500 performs the steps performed by the electronic device 200 in the voice call translation capability negotiation method shown in FIG. 11, the transceiver module 1501 may be configured to perform step 1101 and the step of sending the seventh character in step 1102, and the processing module 1502 may be configured to perform the determining step in step 1102. When the electronic device 1500 performs the steps performed by the electronic device 200 in the voice call translation capability negotiation method shown in FIG. 13A, the transceiver module 1501 may be configured to perform step 1301 and the step of sending the ninth character in step 1302, and the processing module 1502 may be configured to perform the step of disabling the broadcast mode and the step of enabling the text display mode in step 1302. When the electronic device 1500 performs the steps performed by the electronic device 200 in the voice call translation capability negotiation method shown in FIG. 13B, the transceiver module 1501 may be configured to perform step 13010, the step of sending the ninth character in step 1320, and the step of receiving the tenth character in step 1340, and the processing module 1502 may be configured to perform the step of disabling the broadcast mode and enabling the text display mode in step 1340.

Figure 16:
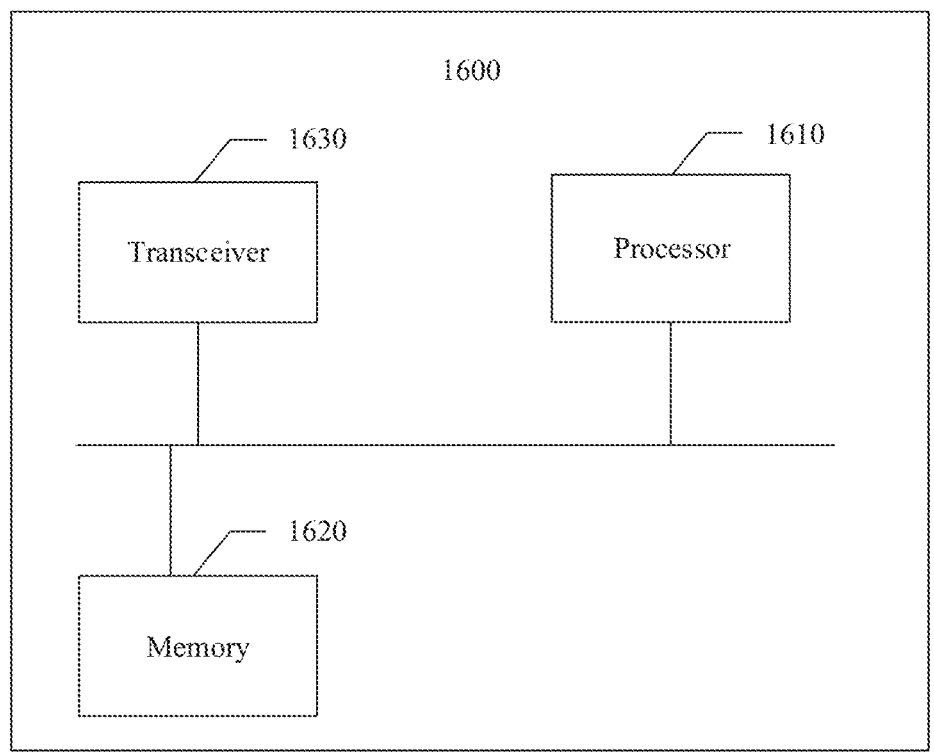
FIG. 16 is a schematic structural diagram of another electronic device according to an embodiment of this application.

Based on a same concept, FIG. 16 shows an electronic device 1600 according to this application. The electronic device 1600 includes at least one processor 1610, a memory 1620, and a transceiver 1630. The processor 1610 is coupled to the memory 1620 and the transceiver 1630. Couplings in this embodiment of this application are indirect couplings or communication connections between apparatuses, units, or modules. The indirect couplings or communication connections between the apparatuses, units, or modules may be implemented in electrical, mechanical, or other forms, and are used for information exchange between the apparatuses, units, or modules.

Specifically, the memory 1620 is configured to store a program instruction.

The transceiver 1630 is configured to receive or send data.

The processor 1610 is configured to invoke the program instruction stored in the memory 1620, so that the electronic device 1600 performs the steps performed by the electronic device 200 in FIG. 3, or performs the steps performed by the electronic device 100 in FIG. 9, FIG. 11, FIG. 13A, or FIG. 13B.

It should be understood that the electronic device 1500 and the electronic device 1600 may be configured to implement the methods shown in FIG. 3, FIG. 9, FIG. 11, FIG. 13A, and/or FIG. 13A in the embodiments of this application. For related features, refer to the foregoing descriptions. Details are not described herein again.

A person of ordinary skill in the art may clearly understand that the embodiments of this application may be implemented through hardware, firmware, or a combination thereof. When the software is used to implement the embodiments of this application the foregoing functions may be stored in a computer-readable medium or transmitted as one or more instructions or code in a computer-readable medium. The computer-readable medium includes a computer storage medium and a communications medium. The communications medium includes any medium that enables a computer program to be transmitted from one place to another place. The storage medium may be any available medium accessible by a computer. By way of example and not limitation, the computer-readable medium may include a RAM, a ROM, an electrically erasable programmable read-only memory (electrically erasable programmable read only memory, EEPROM), a compact disc read-only memory (CD-ROM) or another compact disc storage, a magnetic disk storage medium or another magnetic storage device, or any other medium that can be configured to carry or store desired program code in a form of an instruction or a data structure and that can be accessed by a computer. In addition, any connection may be appropriately defined as a computer-readable medium. For example, if software is transmitted from a website, a server, or another remote source by using a coaxial cable, an optical fiber cable, a twisted pair, a digital subscriber line (DSL), or a wireless technology such as an infrared technology, a radio technology, or a microwave technology, the coaxial cable, the optical fiber cable, the twisted pair, the DSL, or the wireless technology such as the infrared technology, the radio technology, or the microwave technology is included in a fixation of a medium to which the coaxial cable, the optical fiber cable, the twisted pair, the DSL, or the wireless technology such as the infrared technology, the radio technology, or the microwave technology belongs. A disk and a disc that are used in the embodiments of this application include a compact disc (CD), a laser disc, an optical disc, a digital video disc (DVD), a floppy disk, and a Blu-ray disc. The disk usually magnetically copies data, and the disc optically copies data in a laser manner. The foregoing combination shall also be included in the protection scope of the computer-readable medium.

In conclusion, the foregoing descriptions are merely the embodiments of this application, but are not intended to limit the protection scope of this application. Any modification, equivalent replacement, or improvement made according to the disclosure of this application shall fall within the protection scope of this application.

What is claimed is:

1. A method comprising:
   after a first electronic device establishes a communication link with a second electronic device, and when a voice call translation function of the first electronic device is in an enabled state, receiving, by the first electronic device, first indication information sent by the second electronic device, wherein the first indication information indicates that a voice call translation function of the second electronic device is enabled;
   wherein when the voice call translation function of the first electronic device is in the enabled state, the first electronic device is configured to: obtain a translation result of a speech received by the first electronic device through a first microphone, obtain a translation result of a received speech sent by the second electronic device, and send, to the second electronic device, the translation result of the speech received by the first electronic device through the first microphone; and
   wherein when the voice call translation function of the second electronic device is enabled, the second electronic device is configured to: obtain a translation result of a speech received by the second electronic device through a second microphone, obtain a translation result of a received speech sent by the first electronic device, and send, to the first electronic device, the translation result of the speech received by the second electronic device through the second microphone; and
   automatically disabling, by the first electronic device, the voice call translation function of the first electronic device in response to receiving the first indication information.

2. The method according to claim 1, wherein the first indication information is a first character sent in a dual-tone multifrequency (DTMF) tone.

3. The method according to claim 1, wherein after automatically disabling, by the first electronic device, the voice call translation function of the first electronic device, the method further comprises:
   sending, by the first electronic device, second indication information to the second electronic device, wherein the second indication information indicates that the voice call translation function of the first electronic device is disabled.

4. The method according to claim 1, wherein the method further comprises:
   displaying, by the first electronic device, first prompt information on a display, wherein the first prompt information notifies a user that the voice call translation function of the second electronic device is enabled; and/or
   notifying, by the first electronic device through voice broadcast, the user that the voice call translation function of the second electronic device is enabled.

5. The method according to claim 1, wherein after automatically disabling, by the first electronic device, the voice call translation function of the first electronic device, the method further comprises:
   prohibiting, by the first electronic device, a user from enabling the voice call translation function of the first electronic device.

6. The method according to claim 5, wherein after prohibiting, by the first electronic device, the user from enabling the voice call translation function of the first electronic device, the method further comprises:
   displaying, by the first electronic device, second prompt information on a display, wherein the second prompt information notifies that the user is prohibited from enabling the voice call translation function of the first electronic device, and cancels, after the voice call function of the second electronic device is disabled or the communication link is disconnected, prohibition on enabling the voice call translation function of the first electronic device by the user; and/or
   notifying, by the first electronic device through voice broadcast, that the user is prohibited from enabling the voice call translation function of the first electronic device, and canceling, after the voice call function of the second electronic device is disabled or the communication link is disconnected, the prohibition on enabling of the voice call translation function of the first electronic device by the user.

7. A method comprising:
   after a first electronic device establishes a communication link with a second electronic device, and when a voice call translation function of the first electronic device is in an enabled state, receiving first indication information sent by the second electronic device, wherein the first indication information indicates that a voice call translation function of the second electronic device is enabled;
   wherein when the voice call translation function of the first electronic device is in the enabled state, the first electronic device is configured to: obtain a translation result of a first speech received by the first electronic device through a first microphone, and send, to the second electronic device, the translation result of the first speech; and when the voice call translation function of the second electronic device is enabled, the second electronic device is configured to: obtain a translation result of a second speech received by the second electronic device through a second microphone, and send, to the first electronic device, the translation result of the second speech;
   after receiving the first indication information, disabling, by the first electronic device, a voice broadcast mode of the first electronic device, and enabling a text display mode of the first electronic device; and when the voice broadcast mode of the first electronic device is disabled and the text display mode of the first electronic device is enabled, skipping, by the first electronic device, broadcasting the translation result of the second speech received from the second electronic device, and displaying a text of the translation result of the second speech received from the second electronic device; and
   sending, by the first electronic device, second indication information to the second electronic device, wherein the second indication information indicates the second electronic device to disable a voice broadcast mode of the second electronic device and to enable a text display mode of the second electronic device; and when the voice broadcast mode of the second electronic device is disabled and the text display mode of the second electronic device is enabled, the second electronic device is configured to skip broadcasting the translation result of the first speech received from the first electronic device, and displaying a text of the translation result of the first speech received from the first electronic device.

8. The method according to claim 7, wherein when the voice call translation function of the first electronic device is in the enabled state, the first electronic device is further configured to send, to the second electronic device, the first speech received through the first microphone; and when the voice call translation function of the second electronic device is enabled, the second electronic device is further configured to send, to the first electronic device, the second speech received through the second microphone.

9. The method according to claim 8, wherein when the voice broadcast mode of the first electronic device is disabled, the method further comprises: skipping, by the first electronic device, broadcasting the second speech that is sent by the second electronic device.

10. The method according to claim 7, wherein the first indication information is sent a dual-tone multifrequency (DTMF) tone.

11. A first electronic device, comprising:
at least one processor; and
a memory coupled to the at least one processor, wherein the memory comprises instructions that, when executed by the at least one processor, cause the first electronic device to perform operations comprising:
after the first electronic device establishes a communication link with a second electronic device, and when a voice call translation function of the first electronic device is in an enabled state, receiving first indication information sent by the second electronic device, wherein the first indication information indicates that a voice call translation function of the second electronic device is enabled;
wherein when the voice call translation function of the first electronic device is in the enabled state, the first electronic device is configured to: obtain a translation result of a speech received by the first electronic device through a first microphone, obtain a translation result of a received speech sent by the second electronic device, and send, to the second electronic device, the translation result of the speech received by the first electronic device through the first microphone; and when the voice call translation function of the second electronic device is enabled, the second electronic device is configured to: obtain a translation result of a speech received by the second electronic device through a second microphone, obtain a translation result of a received speech sent by the first electronic device, and send, to the first electronic device, the translation result of the speech received by the second electronic device through the second microphone; and
automatically disabling the voice call translation function of the first electronic device in response to receiving the first indication information.

12. The first electronic device according to claim 11, wherein the first indication information is a first character sent in a dual-tone multifrequency (DTMF) tone.

13. The first electronic device according to claim 11, wherein the operations further comprise:
sending second indication information to the second electronic device, wherein the second indication information indicates that the voice call translation function of the first electronic device is disabled.

14. The first electronic device according to claim 11, wherein the operations further comprise:
displaying first prompt information on a display, wherein the first prompt information notifies a user that the voice call translation function of the second electronic device is enabled;
and/or notifying, through voice broadcast, the user that the voice call translation function of the second electronic device is enabled.

15. The first electronic device according to claim 11, wherein the operations further comprise:
prohibiting a user from enabling the voice call translation function of the first electronic device.

16. The first electronic device according to claim 15, wherein the operations further comprise:
displaying second prompt information on a display, wherein the second prompt information notifies that the user is prohibited from enabling the voice call translation function of the first electronic device, and cancels, after the voice call function of the second electronic device is disabled or the communication link is disconnected, prohibition on enabling the voice call translation function of the first electronic device by the user; and/or
notifying, through voice broadcast, that the user is prohibited from enabling the voice call translation function of the first electronic device, and canceling, after the voice call function of the second electronic device is disabled or the communication link is disconnected, the prohibition on enabling of the voice call translation function of the first electronic device by the user.

* * * * *